(12) United States Patent
Lee et al.

(10) Patent No.: US 11,615,792 B2
(45) Date of Patent: Mar. 28, 2023

(54) ARTIFICIAL INTELLIGENCE-BASED APPLIANCE CONTROL APPARATUS AND APPLIANCE CONTROLLING SYSTEM INCLUDING THE SAME

(71) Applicant: LG Electronics Inc., Seoul (KR)

(72) Inventors: Heungkyu Lee, Seoul (KR); Jaecheol Lyu, Seoul (KR); Sangbae Park, Seoul (KR); Seungmyun Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 16/686,022

(22) Filed: Nov. 15, 2019

(65) Prior Publication Data
US 2020/0082827 A1 Mar. 12, 2020

(30) Foreign Application Priority Data

Nov. 16, 2018 (KR) ......................... 10-2018-0141611

(51) Int. Cl.
*G10L 15/00* (2013.01)
*G10L 15/22* (2006.01)
*H04L 12/28* (2006.01)

(52) U.S. Cl.
CPC ............ *G10L 15/22* (2013.01); *H04L 12/282* (2013.01); *H04L 12/2829* (2013.01); *G10L 2015/223* (2013.01)

(58) Field of Classification Search
CPC ......... G10L 15/30; G10L 15/32; G10L 15/34; G10L 15/28; G10L 17/02; G10L 17/04;
(Continued)

(56) References Cited

U.S. PATENT DOCUMENTS 7,752,050 B1 * 7/2010 Hameed ............. A61B 1/00042
704/275
9,026,431 B1 * 5/2015 Moreno Mengibar .....................
G10L 15/1822
704/250
(Continued)

FOREIGN PATENT DOCUMENTS

KR 1020100122027 11/2010
KR 101896216 9/2018
(Continued)

OTHER PUBLICATIONS

A. A. Arriany and M. S. Musbah, "Applying voice recognition technology for smart home networks," 2016 International Conference on Engineering & MIS (ICEMIS), 2016, pp. 1-6. (Year: 2016).*

(Continued)

*Primary Examiner* — Edgar X Guerra-Erazo
(74) *Attorney, Agent, or Firm* — Fish & Richardson P.C.

(57) ABSTRACT

An appliance control apparatus according to an embodiment of the present invention includes a recognition device including a communication unit connected to a speech processing device or a control command input device to receive a control command for an appliance from the speech processing device or the control command input device, and a recognition module configured to recognize a setting environment for the appliance based on the received control command and generate control information for the appliance based on the recognized setting environment, and a control device configured to receive the control information from the recognition device, generate a control signal based on the received control information, and transmit the generated control signal to the appliance or a control command input device connected to the appliance.

20 Claims, 20 Drawing Sheets

(58) Field of Classification Search
CPC ......... G10L 15/20; G10L 17/08; G10L 17/18;
G10L 17/16; G10L 17/20; G06N 20/00;
G06N 5/022; G06N 3/08; G06N 3/0454;
G06N 3/04; G06N 3/0445; G06N 5/003;
G06N 7/005; G06N 3/006; G06N 3/02;
G06N 3/063
See application file for complete search history.

(56) References Cited

U.S. PATENT DOCUMENTS

| | | | | |
|---|---|---|---|---|
| 9,953,643 | B2* | 4/2018 | Locker | G10L 15/22 |
| 10,839,806 | B2* | 11/2020 | Jeon | G06F 3/167 |
| 11,069,355 | B2* | 7/2021 | Lee | G10L 15/30 |
| 2003/0004728 | A1* | 1/2003 | Keiller | G10L 15/00 |
| | | | | 704/E15.044 |
| 2005/0038660 | A1* | 2/2005 | Black | G10L 15/26 |
| | | | | 704/E15.045 |
| 2007/0271512 | A1* | 11/2007 | Knight | G06F 3/01 |
| | | | | 715/764 |
| 2009/0326957 | A1* | 12/2009 | Yang | G10L 15/26 |
| | | | | 715/728 |
| 2010/0286801 | A1 | 11/2010 | Yum et al. | |
| 2011/0184740 | A1* | 7/2011 | Gruenstein | G10L 15/30 |
| | | | | 704/275 |
| 2012/0166184 | A1* | 6/2012 | Locker | G10L 15/22 |
| | | | | 704/E15.001 |
| 2016/0111091 | A1* | 4/2016 | Bakish | G10L 15/30 |
| | | | | 704/275 |
| 2018/0322872 | A1 | 11/2018 | Cha et al. | |
| 2019/0013024 | A1* | 1/2019 | Jeon | G06F 40/40 |
| 2019/0173687 | A1* | 6/2019 | MacKay | H04L 12/2814 |
| 2021/0304763 | A1* | 9/2021 | Lee | G10L 15/22 |

FOREIGN PATENT DOCUMENTS

| | | | |
|---|---|---|---|
| KR | 1020180119070 | 11/2018 | |
| KR | 1020180122106 | 11/2018 | |
| WO | WO-2015196063 | * 12/2015 | ............. G06F 21/32 |

OTHER PUBLICATIONS

Y. Mittal, P. Toshniwal, S. Sharma, D. Singhal, R. Gupta and V. K. Mittal, "A voice-controlled multi-functional Smart Home Automation System," 2015 Annual IEEE India Conference (INDICON), 2015, pp. 1-6. (Year: 2015).*

Korean Office Action of Korean Application 10-2018-0141611 dated Apr. 25, 2019 (4 pages).

* cited by examiner

FIG. 23
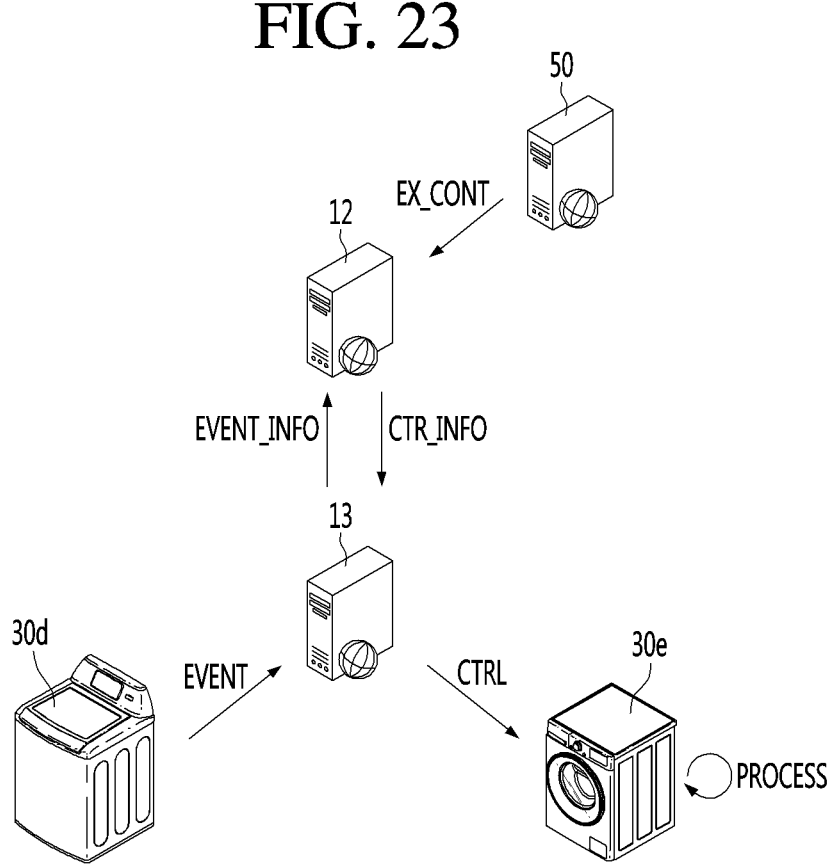
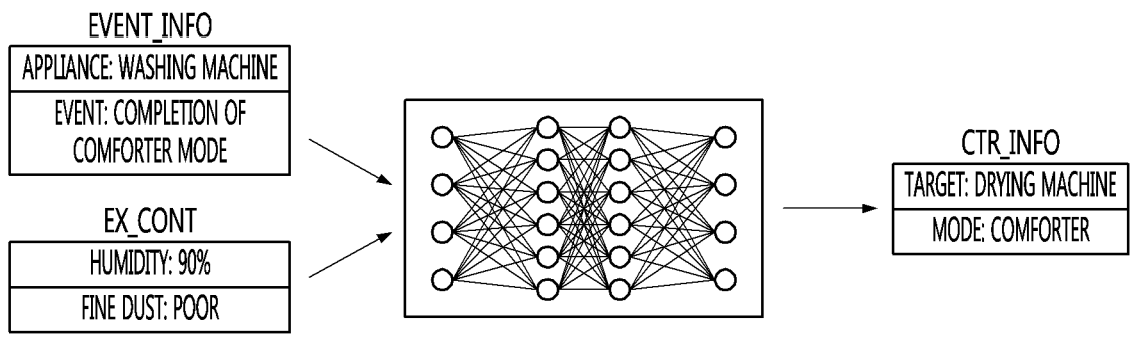

ARTIFICIAL INTELLIGENCE-BASED APPLIANCE CONTROL APPARATUS AND APPLIANCE CONTROLLING SYSTEM INCLUDING THE SAME

CROSS-REFERENCE TO RELATED APPLICATIONS

The present application claims priority under 35 U.S.C. 119 and 35 U.S.C. 365 to Korean Patent Application No. 10-2018-0141611, filed on Nov. 16, 2018, which is hereby incorporated by reference in its entirety.

FIELD

The present invention relates to an appliance control apparatus, and more particularly, to an artificial intelligence-based appliance control apparatus capable of controlling an appliance based on artificial intelligence technology, and a system including the same.

BACKGROUND

Recently, interest in artificial intelligence technology is increasing. There is machine learning as a technology for realizing human learning ability on a computer among various fields of the artificial intelligence technology.

Conventional machine learning has been mainly used statistical-based classification, regression, and cluster models. In particular, in the learning of classification and regression models, a learning model that identifies the characteristics of learning data and new data based on the characteristics has been defined in advance. On the other hand, in recent years, with the emergence of big data concept, deep learning for which interest is increasing, refer to a technology in which the computer itself finds and identifies characteristics using vast amounts of data.

Recently, deep-learning frameworks have been provided as open-source in relation to deep-learning. Thus, for effective learning and recognition, technologies related to a learning process, a learning method, and extraction and selection of data used for learning is becoming more important, in addition to the deep learning algorithms. In addition, research is being conducted to utilize machine learning in various products and services.

Meanwhile, with the development of technology, the kinds of home appliances provided in the home are increasing, and various additional functions provided in the home appliances are increasing. Accordingly, researches have been actively conducted to apply the artificial intelligence technology to appliances such as the home appliances to enable users to utilize the home appliances in the optimal manner according to various environments and situations.

SUMMARY

An object of the present invention is to provide an artificial intelligence-based appliance control apparatus capable of recognizing an optimal appliance setting environment based on an appliance control command received from a user and control an operation of the appliance.

Another object of the present invention is to provide an artificial intelligence-based appliance control apparatus capable of by recognizing a setting environment for an appliance or another appliance interlocking with the appliance based on an event occurring in the appliance to actively control operation of various appliances.

Still another object of the present invention is to provide a control command input device capable of enabling an appliance without speech input means such as a microphone to be controlled with speech.

Still another object of the present invention is to provide a control command input device connected to an appliance equipped with no communication module for connecting to an appliance control apparatus in a wired manner or a short-range wireless communication manner to enable signals or data to be transferred between the appliance control apparatus and the appliance.

Still another object of the present invention is to provide an appliance control apparatus capable of generating control information optimized for a user's intention through interaction with the user in recognizing a setting a setting environment for the appliance and generating control information.

An appliance control apparatus according to an embodiment of the present invention includes a recognition device including a communication unit connected to a speech processing device or a control command input device to receive a control command for an appliance from the speech processing device or the control command input device, and a recognition module configured to recognize a setting environment for the appliance based on the received control command and generate control information for the appliance based on the recognized setting environment, and a control device configured to receive the control information from the recognition device, generate a control signal based on the received control information, and transmit the generated control signal to the appliance or a control command input device connected to the appliance.

The recognition module may include a first recognizer having a recognition model for recognizing the setting environment for the appliance from the received control command, and a control information generation module configured to generate the control information based on the recognized setting environment.

The recognition module may update the recognition model included in the first recognizer using the control command and a result of the recognition.

According to an embodiment, the recognition device may further include a memory configured to store a user profile and an appliance profile, and receive external content from an external content server connected through the communication unit, and the first recognizer may recognize the setting environment based on at least one of the external content, the user profile or the appliance profile, and the control command.

The user profile stored in the memory may include at least one of model information, usage pattern, operation history, group information, or representative appliance information per group, of appliances owned by a user, and the appliance profile stored in the memory may include information on usable functions or modes for each of the models of the appliances.

The control information generation module may generate the control information including at least one of identification information of the appliance, information on a function or mode controlled based on the setting environment, or setting value information related to the function or mode, based on the recognized setting environment.

The control device may acquire code information corresponding to at least one of the information on the function or mode of the appliance or the setting value information based on the identification information of the appliance included in the control information and generate the control signal including the acquired code information when receiving the control information According to an embodiment, the control device may transmit the control signal to the appliance through a representative appliance of a group including the appliance.

According to an embodiment, the control device may receive a response or event information according to the control command from the appliance or a control command input device connected to the appliance, and transmit the received response or event information to the recognition device. The recognition module may further include a second recognizer having a recognition model for recognizing a setting environment for the appliance or a target appliance working with the appliance from the received response or event information. The control information generation module may generate control information for the appliance or the target appliance based on the recognized setting environment.

The recognition device may update the recognition model included in the second recognizer by using the response or event information and a result of the recognition.

The recognition device may further include a memory configured to store a user profile and an appliance profile, and receive external content from an external content server connected through the communication unit, and the second recognizer may recognize the setting environment from at least one of the external content, the user profile or the appliance profile, and the response or event information.

The recognition module may further include a guide provision module configured to generate guide information based on the recognized setting environment, and the recognition device may allow the communication unit to transmit the generated guide information to the speech processing device or the control command input device.

The recognition device may receive a response based on the guide information from the speech processing device or the control command input device, generate control information for the appliance or the target appliance based on the received response, and transmit the generated control information to the control device.

An appliance control system according to an embodiment of the invention, includes a control command input device configured to receive a control command for an appliance and transmit the received control command to a recognition device or a speech processing device, the recognition device configured to receive the control command from the control command input device or the speech processing device, recognize a setting environment for the appliance based on the received control command and generate control information for the appliance based on the recognized setting environment, and a control device configured to receive the control information from the recognition device, generate a control signal based on the received control information, and transmit the generated control signal to the appliance or a control command input device connected to the appliance.

The control command input device may include a microphone configured to receive speech containing the control command, and a communication unit configured to transmit the received speech to the speech processing device.

The control command input device connected to the appliance may connect to the appliance through an interface unit or a short-range wireless communication module of the communication unit, and transmit the control signal received from the control device to the interface unit or the short-range wireless communication module.

According to an embodiment, the recognition device may generate guide information based on the recognized setting environment and transmit the generated guide information to the speech processing device or the control command input device. The control command input device may output the guide information received from the recognition device or the speech processing device, receive a response based on the output guide information, and transmit the received response to the recognition device or the speech processing device.

BRIEF DESCRIPTION OF THE DRAWINGS

FIG. 23 is an exemplary diagram related to the control operation shown in FIG. 22.

DETAILED DESCRIPTION

Hereinafter, embodiments disclosed herein will be described in detail with reference to the accompanying drawings. It is to be understood that the accompanying drawings are included to provide a further understanding of the invention, and the technical idea disclosed in the present specification is not limited by the accompanying drawings, but includes all changes, equivalents, and alternatives falling within the spirit and scope of the present invention.

Figure 1:
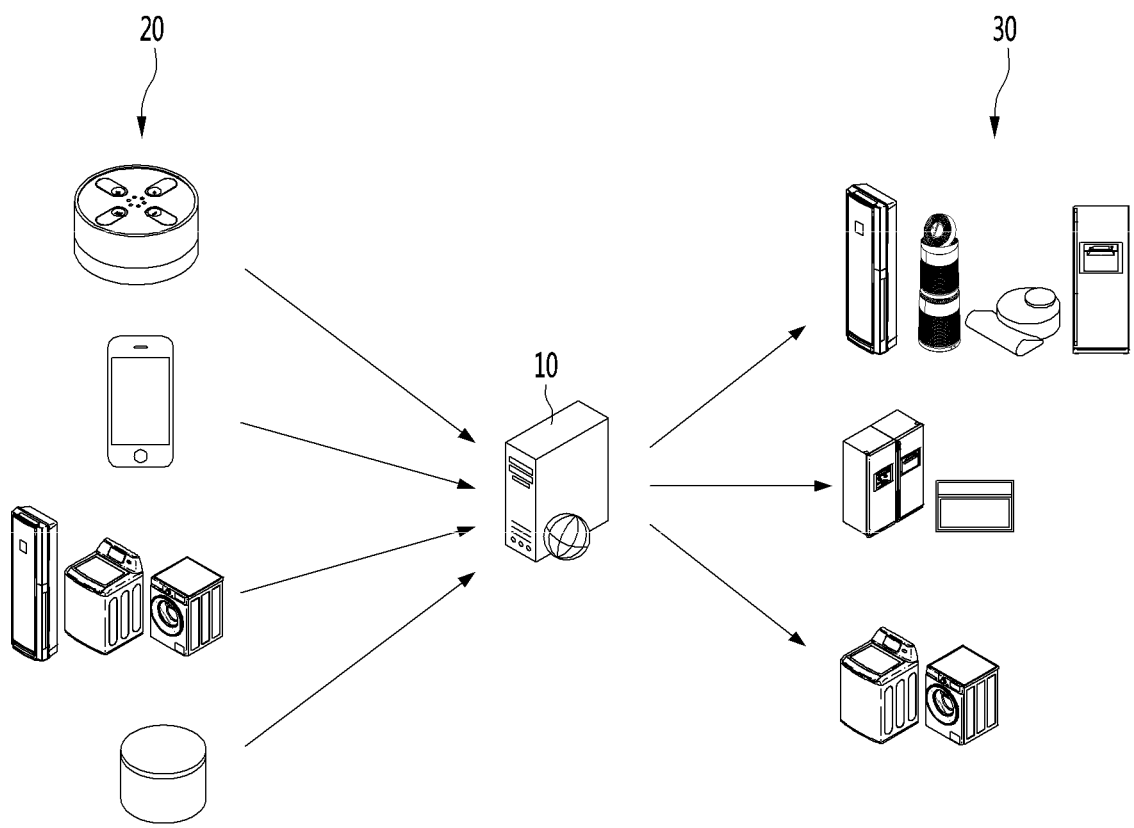
FIG. 1 is a conceptual diagram of an appliance control system according to an embodiment of the present invention.

FIG. 1 is a conceptual diagram of an appliance control system according to an embodiment of the present invention.

Referring to FIG. 1, an appliance control system may include an appliance control apparatus 10, at least one control command input device 20, and at least one appliance 30.

Although the present invention will be described below under the assumption that the appliance is a home appliance used in the home, but embodiments of the present invention are not limited to the home appliance. For example, the appliance may include an office appliance used in a work space or the like, and may include various other appliances.

The appliance control apparatus 10 may receive various types of control commands from the control command input device and transmit a control signal based on a received control command to the appliance 30.

In addition, the appliance control apparatus 10 may receive information on an event that has occurred in the appliance 30, and may notify the user of the received information through the control command input device 20.

Such an appliance control apparatus 10 may be implemented with at least one server. The specific configuration and operation of the appliance control apparatus 10 will be described later in more detail.

The control command input device 20 may receive a control command for controlling the appliance 30 from a user and transmit the received control command to the appliance control apparatus 10.

The control command may be input in various forms according to the type of the control command input device 20. For example, when the control command input device 20 includes a microphone, the control command may be input in a speech form. On the other hand, when the control command input device 20 includes a display, the control command may be input in a text form or a graphic form.

Further, the control command input device 20 may include output means such as a speaker or a display. Accordingly, the control command input device 20 may output a processing result, a response, or the like according to the input control command, or may output information or data received from the appliance control apparatus 10. The information or data may be related to various events occurring in the appliance 30.

For example, the control command input device 20 may be an audio output device (e.g., an artificial intelligent speaker) embedded with input means such as a mobile terminal, such as a smart phone or a tablet PC, a microphone, or the like, an appliance embedded with the input means (e.g., a washing machine, refrigerator or the like), or the like.

Further, the control command input device 20 may include a portable speech input device. The portable speech input device may be installed at a certain position in a specific space, or may be detachably attached to a predetermined position of the appliance.

According to an embodiment, the portable speech input device may be connected to the appliance through a USB interface or the like in a wired manner, or may be connected to the appliance through a short-range wireless communication manner such as Bluetooth. Accordingly, even though a wired/wireless Internet module such as a Wi-Fi module is not provided in the appliance, the appliance may transmit and receive signals or data to and from the appliance control server 10 through the portable speech input device.

The portable speech input device may receive a speech control command from the user and transmit the received control command to the appliance control apparatus 10. Examples of the portable speech input device will be described later with reference to FIG. 5.

The appliance 30 may mean a device for performing a specific function. For example, the appliance 30 may include various home appliances such as an air conditioner, an air purifier, a vacuum cleaner, a clothes manager, a refrigerator, an oven, a dishwasher, a water purifier, a washing machine, a drying machine.

Each of the appliances 30 may include a communication module for communication connection with the appliance control apparatus 10 or another appliance 30. For example, an appliance 30 equipped with a wireless Internet module such as Wi-Fi may be connected to the appliance control apparatus 10.

On the other hand, the appliance 30 equipped with the short-range communication module such as Bluetooth may be connected to another appliance 30 or the control command input device 20 having the wireless Internet module, and further to the appliance control apparatus 10 via the another appliance or the control command input device 20. In this case, the another appliance may function as a kind of hub.

According to an embodiment, the appliance 30 may not have a communication module. The appliance 30 is wired to the control command input device 20 through a USB interface or the like so that the appliances 30 may transmit and receive signals or data to and from the appliance control apparatus 10 through the control command input device 20.

According to an embodiment, the appliance 30 may include input means such as a microphone. In this case, the appliance 30 may also function as the control command input device 20.

Figure 2:
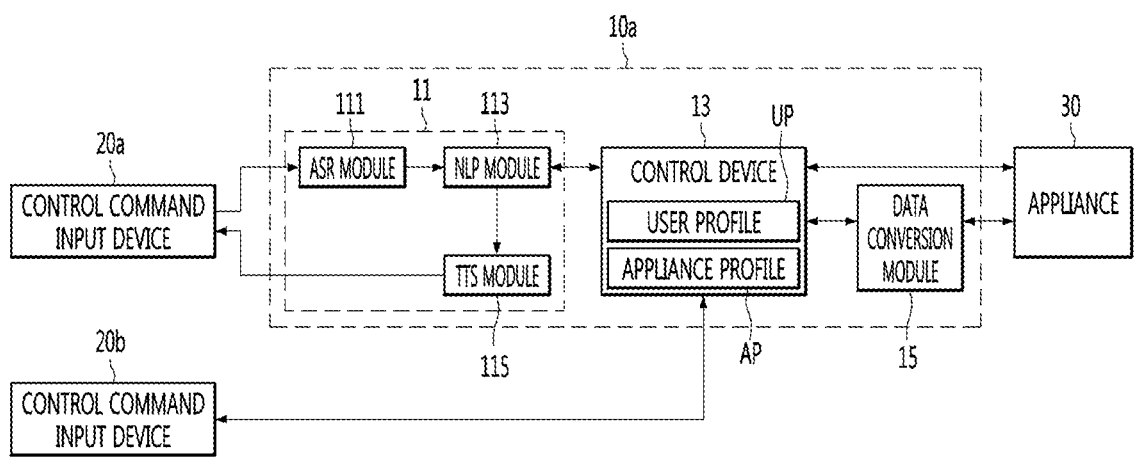
FIG. 2 is a schematic block diagram of an appliance control apparatus according to an embodiment of the present invention.

FIG. 2 is a schematic block diagram of an appliance control apparatus according to an embodiment of the present invention.

Referring to FIG. 2, an appliance control apparatus 10*a* according to an embodiment of the present invention may include a speech processing device 11 and a control device 13. Each of the speech processing device 11 and the control device 13 may be implemented in the form of a separate server or integrated into one server.

The speech processing device 11 may receive speech from the control command input device 20*a*. For example, the speech is a natural language uttered by a user, and the natural language may include a control command for a specific appliance.

The speech processing device 11 may process the received speech to convert it into text, and acquire a control command for a specific appliance from the converted text. The speech processing device 11 may transmit the acquired control command to the control device 13. Alternatively, the speech processing device 11 may convert the text- or code-form message or various information transmitted from the control device 13 into a speech form, and transmit the converted speech-form guide information message or various information to the control command input device 20*a*.

Specifically, the speech processing device 11 may include an automatic speech recognition (ASR) module 111, a natural language processing (NLP) module 113, and a text to speech (TTS) module 115. The ASR module 111, the NLP module 113, and the TTS module 115 may be implemented in one server, or may be implemented as separate servers.

The ASR module 111 may convert the speech transmitted from the control command input device 20*a* into text using a known automatic speech recognition technology.

The NLP module 113 may identify (analyze) whether the converted text includes a control command capable of being processed by the control device 13 or the appliance 30. For example, the NLP module 113 may acquire a keyword for identification of the appliance 30 and/or a keyword associated with the function or operation of the appliance 30 from the natural language corresponding to the converted text. The NLP module 113 may identify the control command based on the acquired keyword.

Alternatively, the NLP module 113 may generate a text in the form of a natural language including the message or information based on the message or information transmitted from the control device 13, and transmit the generated text to the TTS module 115.

The TTS module 115 may convert the text transmitted from the NLP module 113 into speech and transmit the converted speech to the control command input device 20*a*.

The control device 13 may receive a control command for the appliance 30 from the speech processing device 11 or the control command input device 20*b* and generate a control signal corresponding to the received control command. The control device 13 may transmit the generated control signal to the appliance 30. On the other hand, the control command input device 20*b* may receive a control command in the form of a text from a user or receive a control command input based on a GUI displayed on a display.

The control device 13 may generate the control signal based on a user profile UP and an appliance profile AP.

The user profile UP may include information on appliances owned by a user of the control command input device 20*a*. According to an embodiment, the user profile UP may further include various pieces of information such as product information (model information) of appliances owned by a user, an operation history, a usage pattern, an error history, a repair history, or the like for each of the appliances owned by the user.

According to an embodiment, the appliances owned by the user may be grouped by criteria such as spaces or functions, and only a representative appliance of each group may be directly connected to the control device 13. For example, when an air purifier of appliances located in a living room is provided only with a short-range communication module and is not able to directly connect to the control device 13, the air purifier may be connected to the control device 13 through an air conditioner. In this case, among the appliances in the living room, the air conditioner may be a representative appliance.

The control device 13 may control the remaining appliances through the representative appliance. To this end, the user profile UP may further include group information or representative appliance information of the appliances, connection information between the appliances, or the like.

The appliance profile AP may include information on usable functions (modes) of each of products (models) of an appliance, data format for each of the functions (e.g., code information), and the like.

The control device 13 may generate the control signal based on the control command, the user profile UP, and the appliance profile AP. For example, when the control command includes a command to operate the air conditioner in a dehumidification mode, the control device 13 may acquire the product information (model information) of the air conditioner owned by the user from the user profile UP. Then, the control device 13 may acquire code information on the dehumidification mode of the model of the air conditioner owned by the user from the appliance profile AP. The control device 13 may generate a control signal for driving the dehumidification mode of the air conditioner using the acquired code information. The control device 13 may transmit the generated control signal to the air conditioner, and the air conditioner may activate the dehumidification mode in response to the received control signal.

On the other hand, the appliance 30 may have different code information for a specific function depending on models. That is, the code information may be segmented according to the model. In this case, in order for the control device 13 to generate the control signal based on the control command, an additional process may be required to acquire the code information for each of the models. The control device 13 may respectively process a plurality of control commands respectively received from a plurality of users to generate a control signal and therefore, the additional process may cause increase in a load and a decrease in a processing speed in the control device 13.

Accordingly, the appliance control apparatus 10*a* may further include a data conversion module 15 that performs operation of generating a control signal having code information for the model of a target appliance (or a control target appliance). The data conversion module 15 may be implemented as a separate server from the control device 13 or may be implemented as a single server together with the control unit 13. Alternatively, the data conversion module 15 may be implemented separately from the appliance control apparatus 10*a*. According to an embodiment, the data conversion module 15 may be implemented in plural, and each of the data conversion modules 15 may be connected to the control device 13.

When the data conversion module 15 is present, the control device 13 may generate a control signal including integrated code information for a function to be controlled by an appliance based on a control command. The integrated code information may refer to code information commonly set for a specific appliance product group.

The data conversion module 15 may convert the integrated code information included in the control signal into the code information for the model of the target appliance.

To this end, the appliance profile AP may be provided in the data conversion module 15. In this case, the control device 13 may transmit the model information of the target appliance to the data conversion module 15 together with the control signal. The data conversion module 15 may perform conversion of the code information of the control signal based on the model information received from the control device 13.

The data conversion module 15 may be implemented as a platform such as a kind of cloudlet that assists the control server 13. The data conversion module 15 may distribute the load of the control device 13 through the operation as described above. Thus, the load of the control device 13 may be effectively reduced, and the decrease of the processing speed may be minimized.

A configuration of the control device 13 according to an embodiment of the present invention will be described below with reference to FIG. 3.

Figure 3:
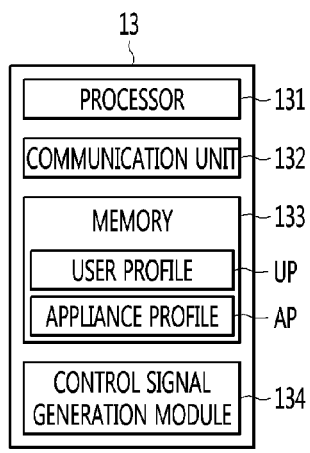
FIG. 3 is a schematic block diagram of a control device shown in FIG. 2.

FIG. 3 is a schematic block diagram of a control device shown in FIG. 2.

Referring to FIG. 3, the control device 13 may include a processor 131, a communication unit 132, a memory 133, and a control signal generation module 134.

The processor 131 may control overall operation of the control device 13.

The processor 131 may receive a control command for the appliance 30 from the speech processing device 11 or the control command input device 20b through the communication unit 132. The processor 131 may allow the control signal generation module 134 to generate a control signal based on the received control command. The processor 131 may transmit the generated control signal to the appliance 30 through the communication unit 132. To this end, the communication unit 132 may include at least one communication module such as an Internet module, a mobile communication module, or the like.

The processor 131 may receive a response according to the control signal from the appliance 30 through the communication unit 132 or receive operation information and state information of the appliance 30. The processor 131 may transmit the received response, operation information, or state information to the speech processing device 11 or the control command input device 20b. Alternatively, the processor 131 may allow the control signal generation module 134 to generate a control signal based on the received response, operation information, or state information. The processor 131 may transmit the generated control signal to the appliance 30 through the communication unit 132.

The processor 131 may include at least one central processing unit (CPU), an application processor (AP), an integrated circuit, a microcontroller, an electrical unit for performing other functions or the like.

The memory 133 may store various information, data, and algorithms for operation of the control device 13. Such a memory 133 may include a non-volatile memory and a volatile memory. The nonvolatile memory may store the various information, data, and algorithms, and the volatile memory may temporarily store data acquired during operation of the control device 13, or information, data, algorithms, or the like loaded from the non-volatile memory.

In particular, the memory 133 may store a user profile UP and an appliance profile AP. The user profile UP and the appliance profile AP may include information needed by the control signal generation module 134 to generate a control signal for a target appliance.

As described above with reference to FIG. 2, the user profile UP may include information on the appliances owned by the user of the control command input device 20a or 20b. According to the embodiment, the user profile UP may further include various pieces of information such as product information (model information) of appliances owned by a user, an operation history, a usage pattern, an error history, a repair history, or the like for each of the appliances owned by the user.

The appliance profile AP may include information on usable functions (modes) of each of products (models) of an appliance, data format for each of the functions (e.g., code information), and the like.

According to an embodiment, when the control device 13 is connected to a separate database device, the user profile UP and the appliance profile AP may be provided in the database device. The processor 131 may receive at least a part of the user profile UP or at least a part of the appliance profile AP from the database device and and store the same in the memory 133.

The control signal generation module 134 may generate a control signal corresponding to a control command received from the speech processing server 11, the control command input device 20b or the like. Although the control signal generation module 134 is illustrated as being a separate configuration from the processor 131, the control signal generation module 134 may be a configuration included in the processor 131.

The control signal generation module 134 may acquire model information of an appliance to be controlled according to the control command among the appliances owned by the user from the user profile UP. The control signal generation module 134 may acquire, from from the appliance profile AP, data (e.g., code information) corresponding to a function to be performed according to the control command among data related to the model of the appliance to be controlled. The control signal generation module 134 may generate a control signal including the acquired data (code information).

According to an embodiment, when the appliance control apparatus 10 includes the data conversion module 15, the control signal generation module 134 may generate a control signal including integrated code information for a function to be performed according to the control command. The data conversion module 15 may convert the integrated code information into code information corresponding to the model of the appliance to be controlled.

A control command input device according to an embodiment of the present invention will be described below with reference to FIGS. 4 and 5.

Figure 4:
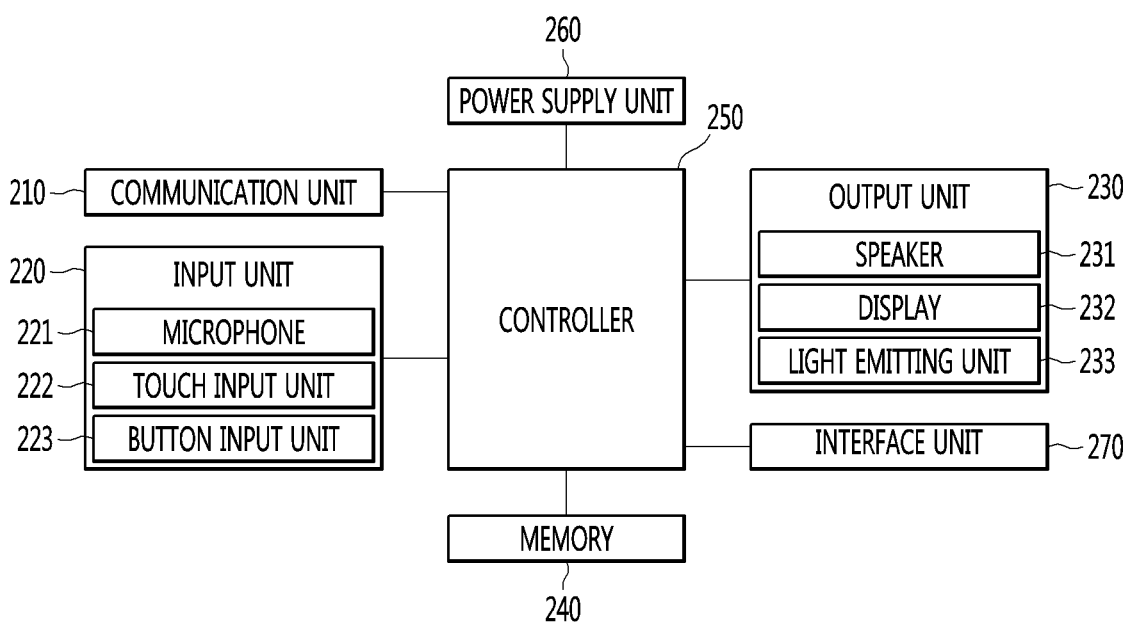
FIG. 4 is a schematic block diagram of a control command input device shown in FIG. 4.

FIG. 4 is a schematic block diagram of a control command input device shown in FIG. 4.

Referring FIG. 4, the control command input device 20 may include a communication unit 210, an input unit 220, an output unit 230, a memory 240, a control unit 250, a power supply unit 260 and an interface unit 270. The configurations shown in FIG. 4 are not essential for implementing the control command input device 20, and therefore, the control command input device 20 may include more or fewer components.

The communication unit 210 may include at least one communication module for connecting the control command input device 20 to the appliance control apparatus 10, the speech processing device 11, the control device 13, the appliance 30, and/or a user's terminal for example, through a network. For example, the communication unit 210 may include a short-range communication module such as a near field communication (NFC) or Bluetooth, a wireless Internet module such as Wi-Fi, or a mobile communication module. The control unit 250 may transmit a control command to the appliance control apparatus 10, specifically, the speech processing device 11 or the control device 13 via the communication unit 210 or may transmit a control signal to the appliance 30. The control unit 250 may receive information or data related to the appliance 30 from the speech processing device 11 or the control device 13 via the communication unit 210 or may receive information or data from the appliance 30.

The input unit 220 may include input means for inputting a predetermined signal, information, and/or data to the control command input device 20 by a behavior, such as a user's operation. For example, the input means may include at least one of a microphone 221, a touch input unit 222, or a button input unit 223. The user may control the operation of the control command input device 20 through the input unit 220.

In particular, the user may input a control command for controlling a target appliance through the input unit 220. The user may input a speech-form control command through the microphone 221. Alternatively, the user may input a control command by inputting the control command in the form of text through the touch input unit 222 or the button input unit 223, or by selecting a menu or icon output through the display 232.

The output unit 230 may output information related to the operation or the state of the control command input device 20. According to an embodiment, the output unit 230 may output information or data received from the appliance control apparatus 10. For example, the information or data received from the appliance control apparatus 10 may include information related to the operation or state of the appliance 30, a response to the control command which is input through the input unit 220, a processing result, or the like.

As an example, the output unit 230 may include at least one of a speaker 231 for outputting various information or data in the form of speech or sound, a display 232 for outputting the various information or data in the form of text or graphic, or a light output unit 233 for outputting the various information or data through a color, a brightness, a light emission pattern, or the like of light.

The memory 240 may store various data such as control data for controlling operations of the components included in the control command input device 20 and data for performing an operation corresponding to the input acquired through the input unit 220, or the like.

The control unit 250 may control overall operation of the control command input device 20. In particular, the control unit 250 may control the input unit 220 to acquire a control command for the appliance 30 from the user. The control unit 250 may transmit the acquired control command to the appliance control apparatus 10 through the communication unit 210. The control unit 250 may receive various information and data from the appliance control apparatus 10 through the communication unit 210 and allow the output unit 230 to output the received information or data.

The control unit 250 may include hardware such as at least one CPU, a microcomputer, and an AP.

The power supply unit 260 may supply power necessary for operation of each of the components included in the control command input device 20.

For example, the power supply unit 260 may correspond to a device connected to an external power source to supply power provided from the power source to the components.

According to an embodiment, the power supply unit 260 may include a battery. The battery may be provided in the control command input device 20 and may be connected to an external power source via a power connection terminal included in the control command input device 20 and be charged. The control command input device 20 equipped with a battery may be implemented as a portable type device capable of being moved by a user or the like within a specific space.

Meanwhile, the power supply unit 260 may further include a wireless power reception unit (for example, a coil) for wirelessly receiving power from the outside. In this case, the control command input device 20 may be seated, attached, or mounted adjacent to the appliance 30 or a wireless power charging device provided with a wireless power transmission unit, and may receive power from the wireless power transmission unit. According to an embodiment, according to a wireless power transmission scheme implemented in the power supply unit 260, the control command input device 20 may receive power even when being separated from the wireless power transmission unit by a predetermined distance. The power supply unit 260 may charge the battery using the supplied power.

The interface unit 270 may provide an interface for connecting the control command input device 20 with another device. For example, the interface unit 270 may provide an interface for wired connection such as a universal serial bus (USB).

For example, the control command input device 20 may be connected to the appliance 30 through the interface unit 270. The appliance 30 may be an appliance without a communication module, but is not limited thereto. That is, the appliance 30 without the communication module may transmit/receive signals or data to/from the appliance control apparatus 10 through the control command input device 20.

According to an embodiment, the control command input device 20 may be supplied with power from the appliance 30 via the interface unit 270.

The control command input device 20 may include an artificial intelligent speaker device, the appliance 30 or the like. Meanwhile, according to an embodiment of the present invention, the control command input device 20 may include a portable speech input device capable of being moved by a user or the like within a predetermined space. The portable speech input device will be described below with reference to FIG. 5.

Figure 5:
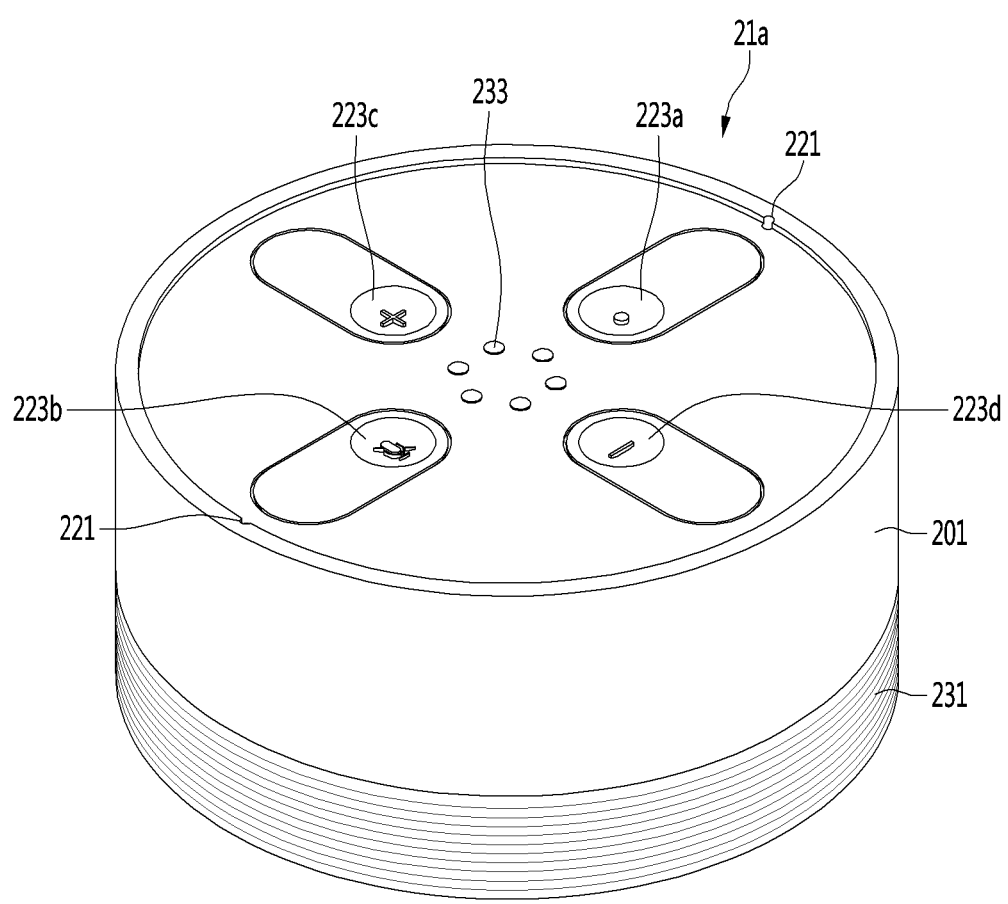
FIG. 5 is a diagram illustrating a portable speech input device as an example of a control command input device.

FIG. 5 is a diagram illustrating a portable speech input device as an example of a control command input device.

Referring to FIG. 5, the portable speech input device 21*a* may be arranged at a desired position within a specific space (e.g., home), and may receive a control command in the form of speech from a user. In addition, an arrangement position of the portable speech input device 21*a* may be freely changed by the user.

The portable speech input device 21*a* may include a casing 201 that forms an appearance, at least one microphone 221, a plurality of button input units 223*a* to 223*d*, a speaker 231, and a light output unit 233. The type of the portable speech input device 21*a* shown in FIG. 5 corresponds to an example for convenience of description and therefore, the portable speech input device 21*a* is not limited to the type shown in FIG. 5.

A portion in which the microphone 221, the plurality of button input units 223*a* to 223*d* and the light output unit 233 are arranged is defined as an upper portion of the portable speech input device 21*a*, and a portion in which the speaker 233 is arranged is defined as a lower portion of the portable speech input device 21*a*.

The portable speech input device 21*a* may be seated, attached, or mounted at various positions in the space. In this case, the bottom surface of the lower portion of the portable speech input device 21*a* may correspond to a seating surface, an attachment surface, or a mounting surface.

In this case, the microphone 221, the plurality of button input units 223*a* to 223*d*, and the light output unit 233 may be provided on the upper portion of the portable speech input device 21*a*. Therefore, the microphone 221 may receive the user's speech more accurately. In addition, the user may easily operate the button input units 223*a* to 223*d* and easily identify light output from the light output unit 233.

The portable speech input device 21a may include the microphone 221 to receive a speech-form control command from the user. According to an embodiment, as shown in FIG. 5, the portable speech input device 21a is provided with a plurality of microphones 221, which makes it possible to receive the speech uttered by the user more accurately.

That is, the user may control an appliance provided with no microphone through speech, using the portable speech input device 21a.

When the microphone 221 is provided in the appliance 30, a test for the optimum position of the microphone 221 to achieve a predetermined speech recognition rate for each of models of the appliance 30 or the performance of the microphone 221, may be required. That is, additional time or cost caused by the test may be incurred in developing a product. In addition, the degree of difficulty of a process may increase to implement the microphone 221 at the optimum position. During the operation of the appliance 30, it may not be easy to recognize speech received by the microphone 221 due to noise.

As the portable speech input device 21a is implemented, the microphone 221 may not be provided in the appliance 30, and problems such as the above-described test time, projected cost, or increase in the process difficulty may be solved.

With continued reference to FIG. 5, the appliance 30 may include the plurality of button input units 223a to 223d. The user may control the operation of the portable speech input device 21a through the plurality of button input units 223a to 223d.

For example, the plurality of button input units 223a to 223d may include a speech input button 223a for allowing the user to input speech, a mute button 223b for deactivating the output of the speaker 231, a volume increase button 223c, and a volume decrease button 223d. However, the plurality of button input units may be implemented in various types.

The speech input button 223a may be a button for acquiring speech including a control command of the appliance 30 from the user. In other words, the speech input button 223a may correspond to a button for activating the microphone 221.

For example, after or while the user presses the speech input button 223a, the control unit 250 may activate the microphone 221 to acquire speech uttered by the user. The user may press the speech input button 223a again or terminate the pressing operation after completing the speech utterance. In this case, the control unit 250 may deactivate the microphone 221 and transmit the received speech to the speech processing device 11.

The light output unit 233 may display operation information and state information of the portable speech input device 21a. The light output unit 233 may include at least one LED. For example, the control unit 250 may allow the light output unit 233 to output light in different manners (for example, color, brightness, blinking pattern, or the number of emitting LEDs) according to the operation that is being performed by the portable speech input device 21a or the state of the portable speech input device 21a.

For example, while the user presses the speech input button 223a, the light output unit 233 may output light indicating that speech is being received. The user may start utterance of speech based on the outputted light and may terminate the pressing of the speech input button 223a after the utterance is completed. When the pressing of the speech input button 223a is terminated, the light output unit 233 may output light indicating that the speech has been received or light indicating that the received speech is transmitted to the speech processing device 11.

That is, the user may conveniently control the target appliance through the portable speech input device 21a with speech even in a state of being spaced apart from the target appliance.

On the other hand, when the portable speech input device 21a is provided with a wireless power reception unit (a reception coil or the like), the wireless power reception unit may be disposed adjacent to the bottom surface of the portable speech input device 21a. When the appliance 30 is provided with the wireless power transmission unit (a transmission coil), the portable speech input device 21a may be seated, attached, or mounted so as to correspond to a position where the wireless power transmission unit is provided to receive power from the appliance 30. The portable speech input device 21a may recognize a type of the appliance 30 based on characteristics (frequency, intensity, or the like) of the power received from the appliance 30.

According to another embodiment, the portable speech input device 21a may be attached or mounted to a predetermined position of the appliance 30 and function as input means of the appliance 30. For example, the portable speech input device 21a is attached or mounted to the predetermined position of the appliance 30, and the user may input a command for controlling the operation of the appliance 30 by operating a button of the portable speech input device 21a or rotating the portable speech input device 21a. In this case, various input means such as dials and buttons provided in a conventional appliance 30 may be eliminated or simplified, thereby improving the convenience of a process in manufacturing the appliance 30 and reducing design restriction.

According to an embodiment, the portable speech input device 21a may acquire noise data caused when the appliance 30 is operated through the microphone 221. The portable speech input device 21a may transmit the acquired noise data to a server to allow the server to remotely determine the state of the appliance 30, such as the presence or absence of abnormality of the appliance 30.

Figure 6:
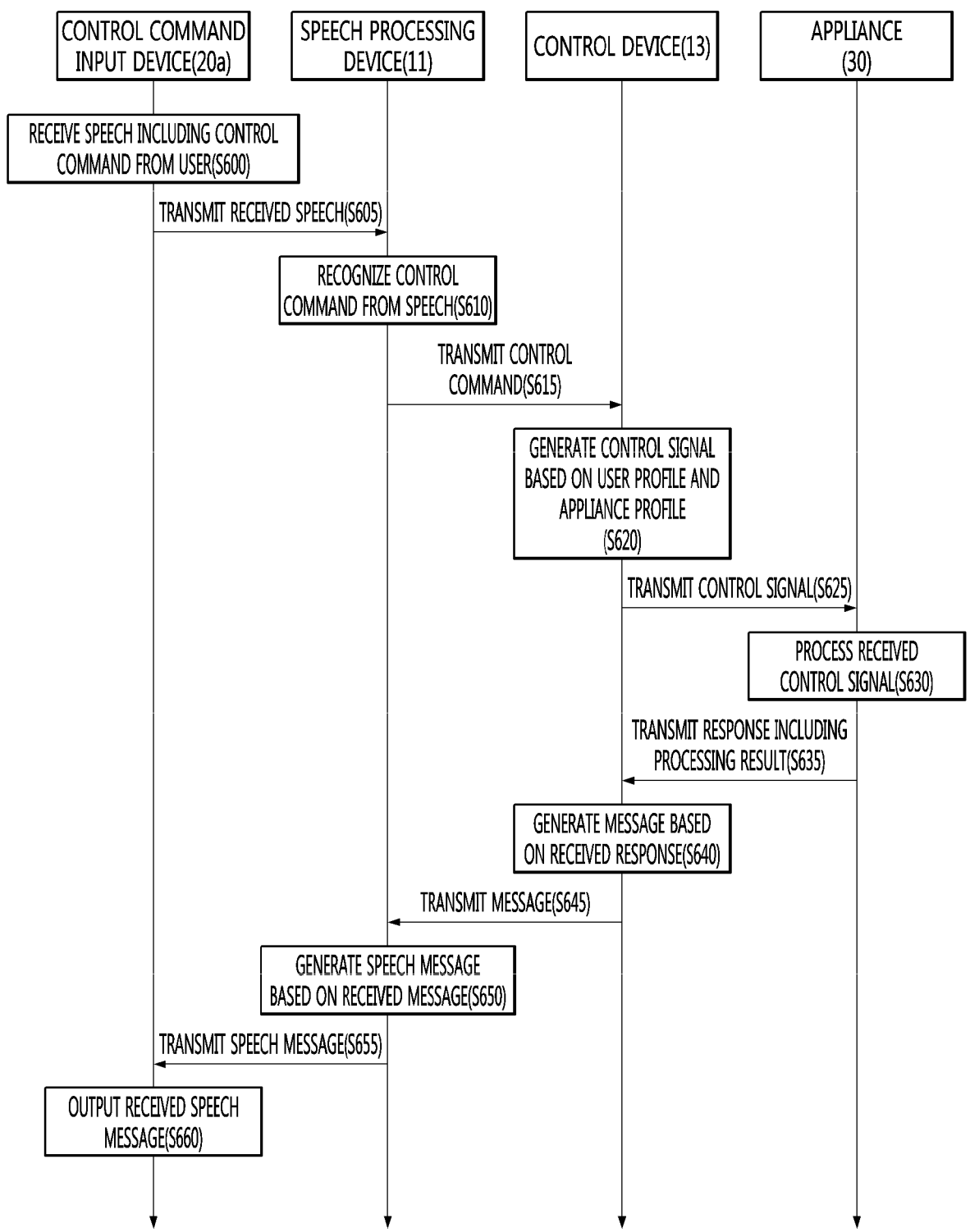
FIG. 6 is a ladder diagram showing an example of control operation of an appliance control system.

FIG. 6 is a ladder diagram showing an example of control operation of an appliance control system.

A discretion will be given with reference to FIG. 6 under the assumption that a control command input from a user is in the form of speech.

Referring to FIG. 6, the control command input device 20a may receive speech including a control command from a user (S600), and transmit the received speech to the speech processing device 11 (S605).

For example, the user may utter the speech including the control command, and the control command input device 20a may receive the speech uttered by the user via the microphone 221.

When the portable speech input device 21a shown in FIG. 5 is taken as an example, the user may utter the speech including the control command after pressing the speech input button 223a or while pressing the speech input button 223a. The control unit 250 of the portable speech input device 21a may activate the microphone 221 and acquire the speech as the speech input button 223a is pressed. The control unit 250 may transmit the received speech to the speech processing device 11 via the communication unit 210.

According to an embodiment, when the portable speech input device 21a is provided with no separate speech input button 223a, the control unit 250 may continuously activate the microphone 221 and, when speech including a preset start word and a control command is received from the user, may transmit the speech to the speech processing device 11.

The speech processing device 11 may recognize the control command from the speech transmitted from the control command input device 20a (S610), and transmit the recognized control command to the control device 13 (S615).

As described with reference to FIG. 2, the ASR module 111 of the speech processing device 11 may convert the speech transmitted from the control command input device 20a into a text form, and the NLP module 113 may recognize whether a control command capable of being processed by the appliance 30 is included in the converted text. When the control command is included, the NLP module 113 may transmit the control command to the control device 13.

When the control command is received, the control device 13 may generate a control signal corresponding to the control command based on the user profile UP and the appliance profile AP (S620).

As described with reference to FIGS. 2 and 3, the control signal generation module 134 of the control device 13 may generate a control signal corresponding to the control command received from the speech processing device 11.

The control signal generation module 134 may acquire model information of an appliance to be controlled according to the control command among the appliances owned by the user from the user profile UP. The control signal generation module 134 may acquire, from from the appliance profile AP, data (e.g., code information) corresponding to a function to be performed according to the control command among data related to the model of the appliance to be controlled. The control signal generation module 134 may generate a control signal including the acquired data (code information).

The control device 13 may transmit the generated control signal to the appliance 30 (S625), and the appliance 30 may process the control signal transmitted from the control device (S630). The appliance 30 may transmit a response including a result of processing of the control signal to the control device 13 (S635).

The processor 131 of the control device 13 may allow the communication unit 132 to transmit the control signal generated by the control signal generation module 134 to the appliance 30 (target appliance) to be controlled.

The appliance 30 may recognize an operation or function to be performed by the appliance 30 based on the data included in the received control signal, and process the control signal by performing the recognized the operation or function.

The appliance 30 may transmit the response (or a response signal) including a result of the processing of the control signal to the control device 13. For example, the response may include information related to the operation or function performed according to the control signal, state information of the appliance 30 as the operation or function is performed, or the like.

According to an embodiment, when the appliance 30 is connected to the control command input device 20a through a USB interface or a short-range wireless communication method, the processor 131 of the control device 13 may transmit the control signal to the appliance 30 via the control command input device 20a. Then, the appliance 30 may transmit the response to the control device 13 through the control command input device 20a. A description related thereto will be given later with reference to FIGS. 10 to 11.

The control device 13 may generate a message to be outputted through the control command input device 20a based on the received response (S640) and transmit the generated message to the speech processing device 11 (S645).

When the response is received from the appliance 30, the processor 131 may generate a message based on information contained in the received response. The message may include a keyword of the information included in the response, a control value, or the like.

The processor 131 may allow the communication unit 132 to transmit the generated message to the speech processing device 11.

The speech processing device 11 may generate a speech message based on the received message (S650), and transmit the generated speech message to the control command input device 20a (S655).

The TTS module 115 of the speech processing device 11 may generate a speech message by converting the received message into a speech form and transmit the generated speech message to the control command input device 20a.

According to an embodiment, the NLP module 113 may process the message in a natural language form based on the keyword or the control value included in the received message. The TTS module 115 may generate a speech message using the message in the natural language form, which is processed by the NLP module 113. Accordingly, the speech processing device 11 may allow the control command input device 20a to output a result of the processing of the appliance 30 in the natural language form.

Although not shown, the control device 13 may also transmit the generated message to the control command input device 20b according to an embodiment.

The control command input device 20a may provide guide on the result of the processing of the control command input by the user by outputting the received speech message (S660).

The control unit 250 of the control command input device 20a may allow the speaker 231 to output the speech message received from the speech processing device 11.

According to an embodiment, when the control command input device 20a receives the message from the control device 13, the control unit 250 may output the received message via the display 232 or the light output unit 233.

That is, according to the embodiment of FIG. 6, when a control command is input from the user, the control device 13 may generate a control signal corresponding to the model of a target appliance using information on appliances owned by the user, thus improving the accuracy of processing of the control command.

Examples relating to the embodiment of FIG. 6 will be described with reference to FIGS. 7 to 9.

Figure 7:
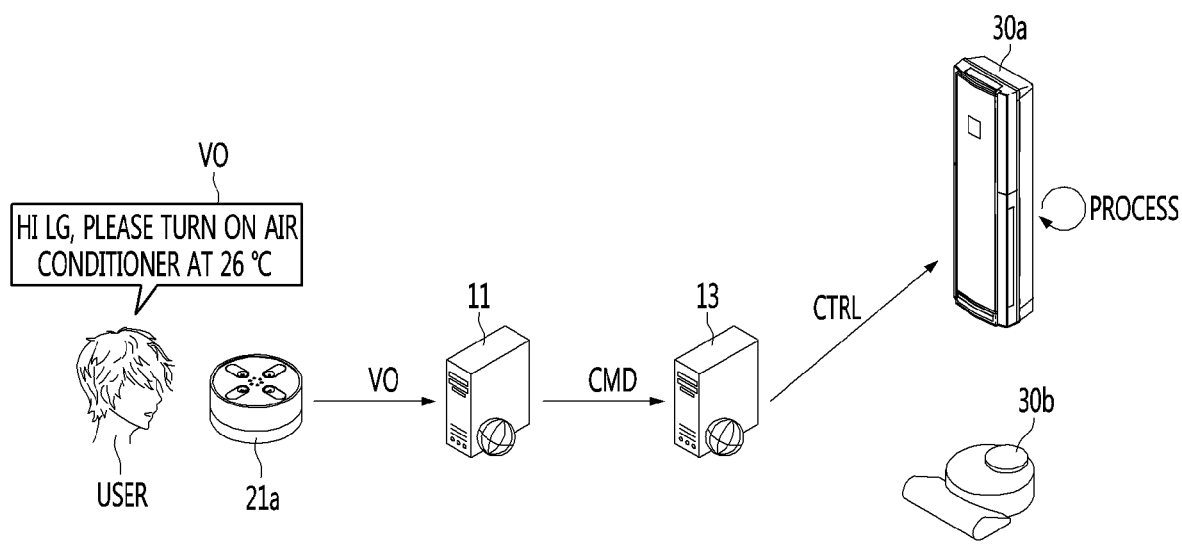
FIGS. 7 and 8 are diagrams of an example of the control operation shown in FIG. 6.
Figure 8:
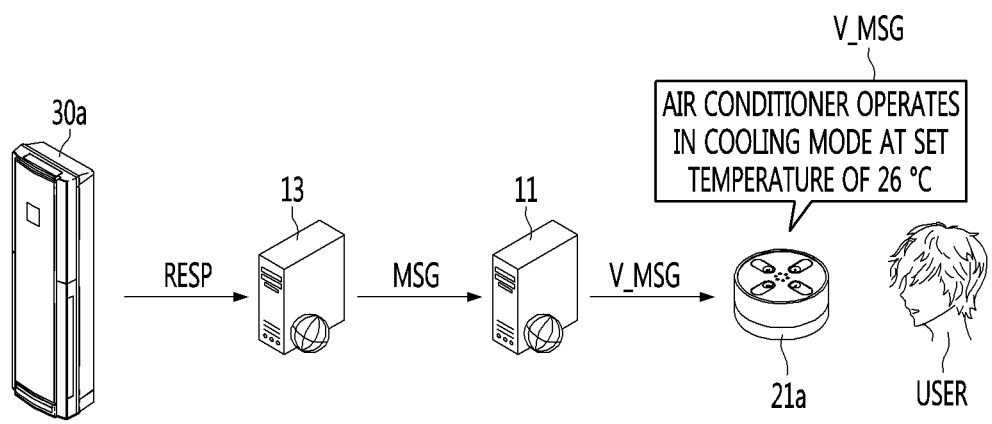

FIGS. 7 and 8 are diagrams illustrating examples of the control operation shown in FIG. 6.

Referring to FIG. 7, when a user USER is present at a position away from an air conditioner 30a, the user USER may input speech (VO) corresponding to "Hi-LG, turn on the air conditioner at 26° C." using the portable speech input device 21a held by the user USER or disposed at a position adjacent to the user USER. In this case, the user may operate the speech input button 223a in inputting the speech VO.

The portable speech input device 21a may transmit the received speech VO to the speech processing device 11.

The ASR module 111 of the speech processing device 11 may convert the received speech VO into text and the NLP module 113 may recognize that the user commands the 'air conditioner' to operate at a 'set temperature of 26° C.'. Based on a recognition result, the NLP module 113 may transmit, to the control device 13, a control command CMD for performing control to set a target appliance to the 'air conditioner' and a room temperature to '26° C.'.

The control device 13 may recognize that the target appliance is the 'air conditioner', from the received control command CMD. The control device 13 may acquire model information of the 'air conditioner' owned by the user from a user profile UP. When the model information is acquired, the control device 13 may acquire the code information for an operation of allowing the model to operate at the 'set temperature of 26° C.' from the appliance profile AP. For example, the code information may have a format such as a hexadecimal code according to a hexadecimal notation, but is not limited thereto.

The control device 13 may generate a control signal CTRL including the acquired code information and transmit the generated control signal CTRL to the air conditioner 30a among the appliances 30a and 30b owned by the user. The air conditioner 30a may receive the control signal CTRL and process the control signal CTRL by operating to lower the room temperature to 26° C. (e.g., cooling operation when the room temperature is higher than 26° C.) based on the code information included in the received control signal CTRL.

Referring to FIG. 8, the air conditioner 30a may generate a response signal RESP including a result of the processing of the control signal CTRL, and transmit the generated response signal RESP to the control device 13. The response signal RESP may include operation information of the air conditioner 30a. For example, in the examples of FIGS. 7 and 8, the response signal RESP may include information indicating 'the set temperature of 26° C.' and 'the cooling mode'.

The control device 13 may acquire the operation information from the received response signal RESP and generate a message MSG including the acquired operation information. For example, the message MSG may include a keyword or a control value indicating 'the set temperature 26° C.' and 'the cooling mode'. The control device 13 may transmit the generated message MSG to the speech processing device 11.

The speech processing device 11 may generate a speech message V_MSG from the received message MSG. For example, the NLP module 113 may convert the message MSG into natural language text (e.g., "The air conditioner operates in a cooling mode at the set temperature 26° C., based on the keyword or the control value (e.g., 'the set temperature 26° C.' and 'the cooling mode') included in the received message MSG. The TTS module 115 may generate a speech message V_MSG from the natural language text and transmit the generated speech message V_MSG to the portable speech input device 21a.

The portable speech input device 21a may output the received speech message V_MSG through the speaker 231. The user USER may identify whether the control command is processed and the operation state of the appliance 30 based on the speech message V_MSG output from the portable speech input device 21a.

Figure 9:
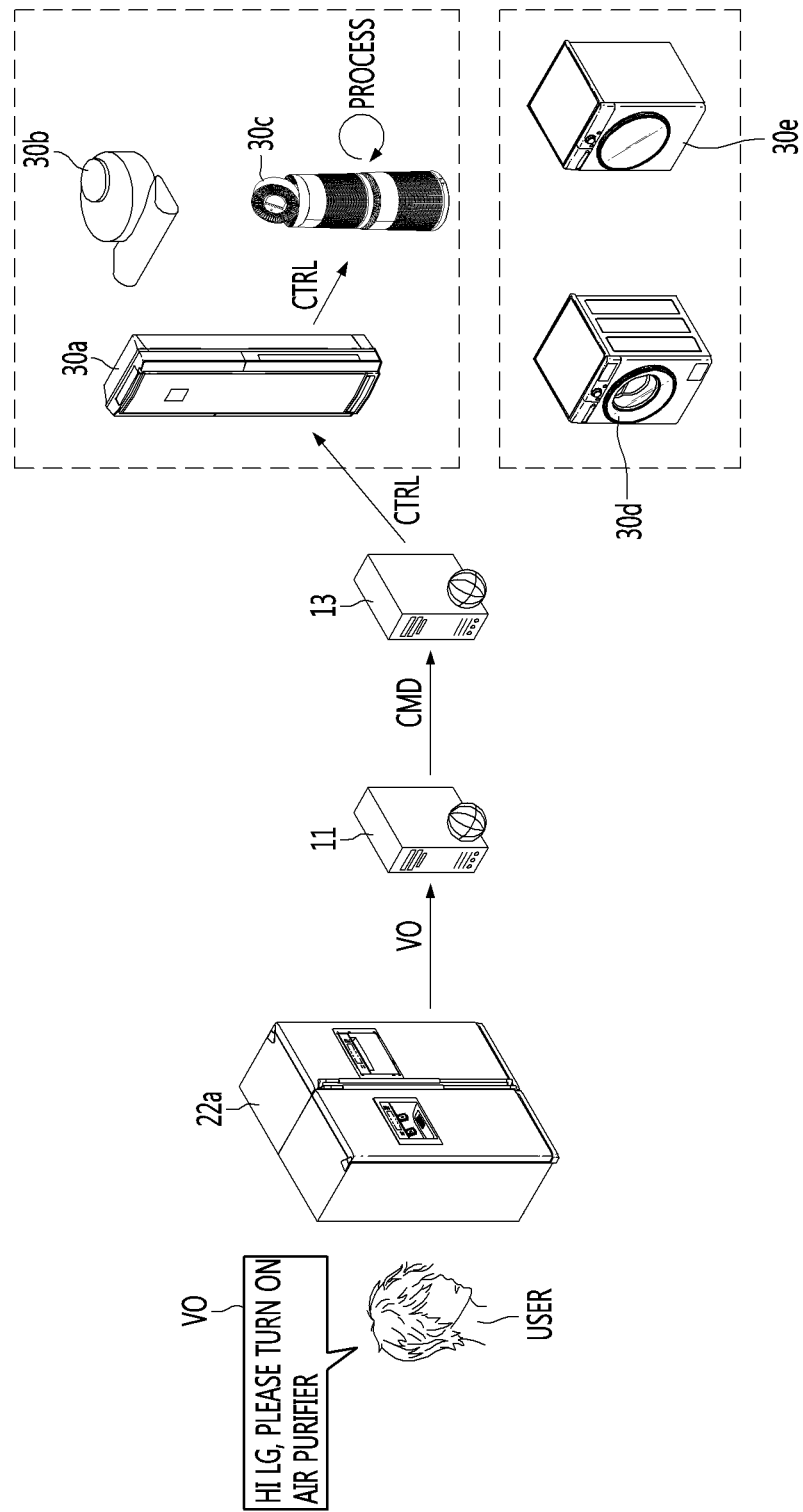
FIG. 9 is a diagram showing another example of the control operation shown in FIG. 6.

FIG. 9 is a diagram showing another example of the control operation shown in FIG. 6. In the embodiment of FIG. 9, the operation of the speech processing device 11 is substantially the same as that of the embodiment of FIG. 7, and the description thereof is simplified.

Referring to FIG. 9, the user USER may attempt to control the operation of an air purifier 30c existing in a living room, while being located in a kitchen. In this case, the user USER is present in the kitchen and may control the operation of the air purifier 30c through an appliance (e.g., refrigerator 22a) including a microphone. Although not shown, the user USER may control the operation of the air purifier 30c through a robot cleaner or a home robot moving in a home space.

Specifically, the user USER may input speech VO corresponding to "High LG, please turn on the air purifier" through the refrigerator 22a. The refrigerator 22a may transmit the received speech VO to the speech processing device 11.

The speech processing device 11 may recognize the control command CMD from the received speech VO and transmit the recognized control command CMD to the control device 13.

The control device 13 may recognize, from the received control command CMD, that a target appliance is the 'air purifier'. The control device 13 may acquire the model information of the 'air purifier' owned by the user from a user profile UP.

Further, the control device 13 may acquire, from the user profile UP, group information, representative appliance information, and/or connection information between the appliances for appliances owned by the user. According to the embodiment shown in FIG. 8, information on a first group including the air conditioner 30a, the robot cleaner 30b and the air purifier 30c and a second group including a washing machine 30d and a drying machine 30e may be stored in the user profile UP. Further, information indicating that a representative appliance of the first group is the air conditioner 30a and a representative appliance of the second group is the washing machine 30d may be stored in the user profile UP.

Based on the obtained information, the control device 13 may identify that it is possible to control the air purifier 30c through the air conditioner 30a.

The control device 13 may acquire, from the appliance profile AP, code information on an operation of powering on the model of the air purifier owned by the user. The control device 13 may generate the control signal CTRL including the acquired code information and transmit the generated control signal CTRL to the air conditioner 30a.

The air conditioner 30a may receive the control signal CTRL and identify that the received control signal CTRL is a control signal for the air purifier 30c. Based on a result of the identification, the air conditioner 30a may transmit the control signal CTRL to the air purifier 30c, and the air purifier 30c may turn on a power supply in response to the received control signal CTRL.

That is, according to the embodiment shown in FIG. 9, the user may easily control a desired appliance using another appliance adjacent thereto. Also, the control device 13 may effectively control the operation of an appliance not directly connected to the control device 13 through the representative appliance of a group.

Figure 10:
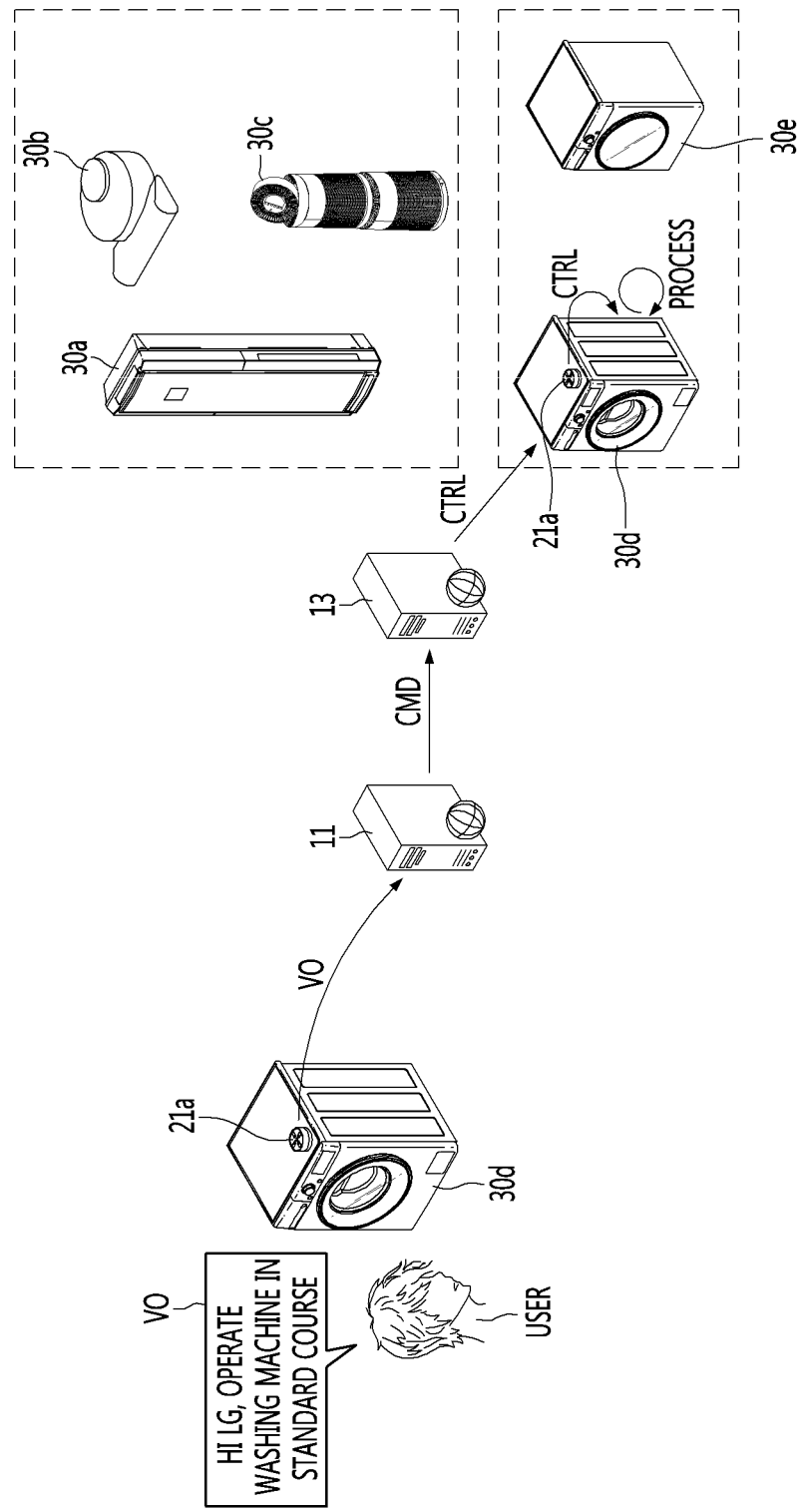
FIGS. 10 and 11 are diagram showing another example of the control operation shown in FIG. 6, in which the control device controls the appliance through the portable speech input device.
Figure 11:
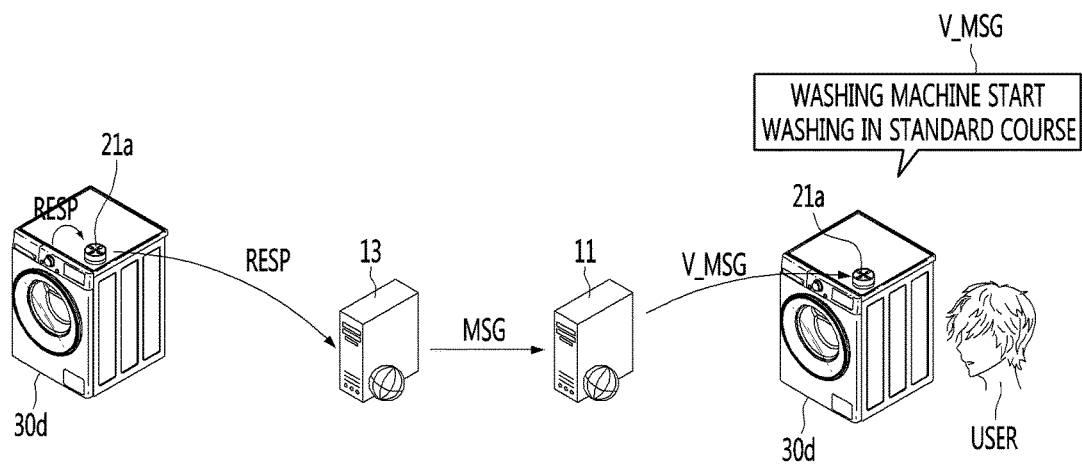

FIGS. 10 and 11 illustrate another embodiment of the control operation shown in FIG. 6, which is an operation of controlling an appliance through the portable speech input device in the control device.

Referring to FIG. 10, the washing machine 30d may be an appliance without a wireless Internet module such as a Wi-Fi module for connecting to the control device 13. According to an embodiment of the present invention, the portable speech input device 21a is connected to the washing machine 30d via a USB interface to enable transmission and reception of signals or data between the washing machine 30d and the control device 13.

The user USER may input speech VO corresponding to "High LG, operate the washing machine in standard course" using the portable speech input device 21a. In this case, the user may operate the speech input button 223*a* of the portable speech input device 21*a* in inputting the speech VO.

The portable speech input device 21*a* may transmit the received speech VO to the speech processing device 11.

The ASR module 111 of the speech processing device 11 may convert the received speech VO into text and the NLP module 113 may recognize that the user commands the 'washing machine' to operate in the 'standard course'. Based on a result of the recognition, the NLP module 113 may transmit, to the control device 13, a control command CMD for performing control to set a target appliance to the 'washing machine', and a washing course to the 'standard course'.

The control device 13 may recognize that the target appliance is the 'washing machine' from the received control command CMD. The control device 13 may acquire model information of the 'washing machine' owned by the user from the user profile UP. When the model information is acquired, the control device 13 may acquire the code information for an operation of allowing the model to operate in the 'standard course' from the appliance profile AP.

The control device 13 may generate a control signal CTRL including the acquired code information and transmit the generated control signal CTRL to the portable speech input device 21*a* connected to the washing machine 30*d*. The portable speech input device 21*a* may transmit the received control signal CTRL to the washing machine 30*d* via a USB interface (or a short-range wireless communication manner). The washing machine 30*d* may receive the control signal CTRL from the portable speech input device 21*a*, set the washing course to the standard course based on code information included in the received control signal CTRL, and process the control signal CTRL by performing operation in the set standard course.

Referring to FIG. 11, the washing machine 30*d* may generate a response signal RESP including a result of the processing of the control signal CTRL and transmit the generated response signal RESP to the portable speech input device 21*a* via the USB interface (or the short-range wireless communication scheme). The response signal RESP may include operation information of the washing machine 30*d*. For example, in the examples of FIGS. 10 and 11, the response signal RESP may include information indicating that operation is performed in the 'standard course'.

The portable speech input device 21*a* may transmit the received response signal RESP to the control device 13. The control device 13 may acquire the operation information from the received response signal RESP and generate a message MSG including the acquired operation information. For example, the message MSG may include additional information such as a keyword indicating the 'standard course' and a remaining time until completion of the operation. The control device 13 may transmit the generated message MSG to the speech processing device 11.

The speech processing device 11 may generate a speech message V_MSG from the received message MSG. For example, the NLP module 113 may convert the message MSG into a natural language text (e.g., the washing machine starts washing in the standard course) based on a keyword ('standard course') included in the received message MSG. The TTS module 115 may generate a speech message V_MSG from the natural language text and transmit the generated speech message V_MSG to the portable speech input device 21*a*.

The portable speech input device 21*a* may output the received speech message V_MSG through the speaker 231.

The user USER may identify whether the control command is processed and the operation state of the washing machine 30*d* based on the speech message V_MSG output from the portable speech input device 21*a*.

That is, according to the embodiments of FIGS. 10 and 11, the user may conveniently control the appliance with speech or the like by connecting the control command input device 20 such as the portable speech input device 21*a* to an appliance not provided with a microphone and a communication module.

Figure 12:
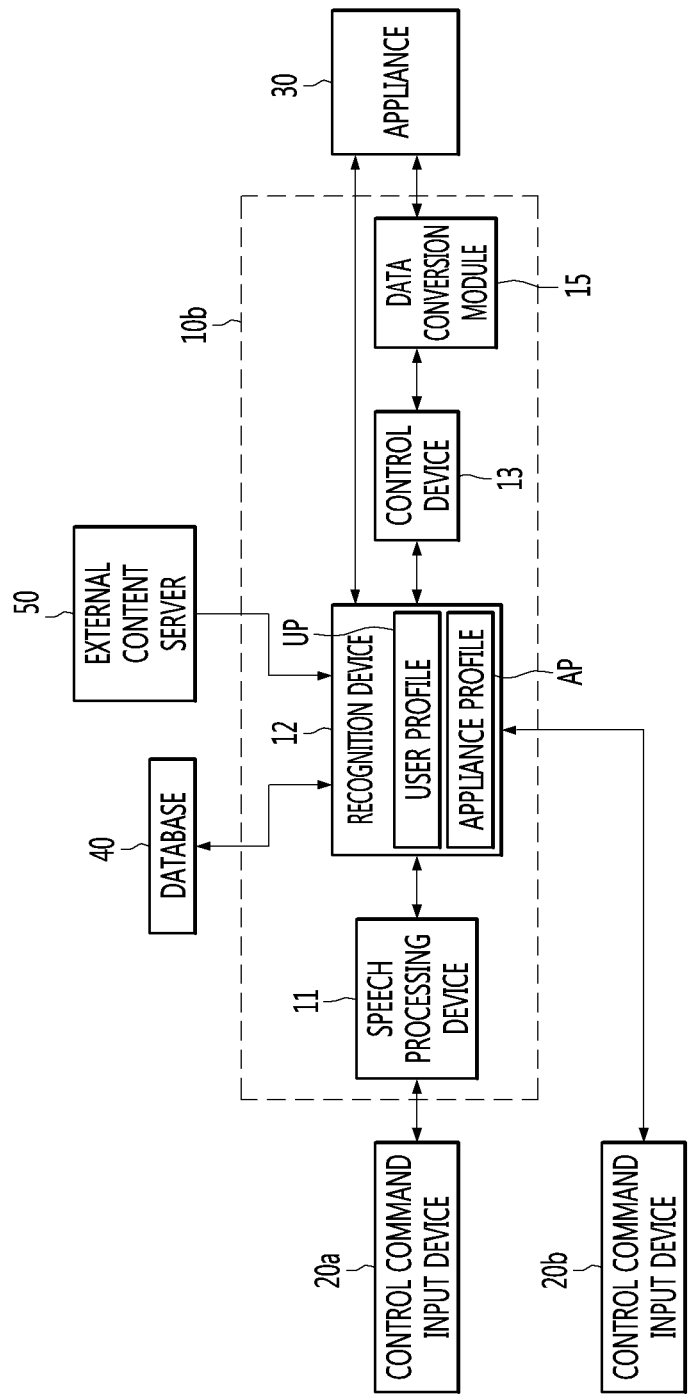
FIG. 12 is a schematic block diagram of an artificial intelligence-based appliance control apparatus according to an embodiment of the present invention.
Figure 13:
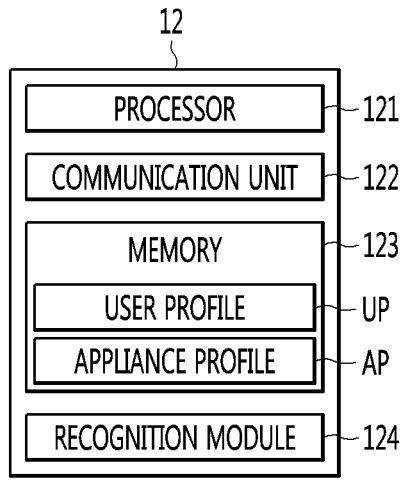
FIG. 13 is a schematic block diagram of the recognition apparatus shown in FIG. 12.

FIG. 12 is a schematic block diagram of an appliance control apparatus based on artificial intelligence according to an embodiment of the present invention, and FIG. 13 is a schematic block diagram of the recognition device shown in FIG. 12.

Referring to FIG. 12, the remaining configuration except for the recognition device 12 is similar to the embodiment of FIG. 2, and a description thereof will be omitted.

Although the recognition device 12 and the control device 13 are described below as separate components in the drawings, the recognition device 12 and the control device 13 may be integrated with each other according to embodiments. In addition, at least some of the components included in the appliance control apparatus 10*b* may be implemented in an integrated configuration.

The appliance control apparatus 10*b* may further include a recognition device 12. When the recognition device 12 is provided, the user profile UP and the appliance profile AP may be included in the recognition device 12 rather than the control device 13.

The recognition device 12 may generate control information for an appliance from the control command input through an artificial intelligence-based recognition model, based on a control command input from the speech processing device 11 or the control command input device 20*b*. The control information for the appliance may refer to optimal control information generated from the input control command by utilizing various data such as external content or a user's appliance usage pattern as well as the control command.

In this regard, referring to FIG. 13, the recognition device 12 may include a recognition module 124 having a recognizer established based on artificial intelligence to generate control information for the appliance. The recognizer and the recognition module 124 will be described later in more detail with reference to FIGS. 14 to 18, FIG. 21, or the like.

The recognition device 12 may include a processor 121, a communication unit 122, a memory 123, and a recognition module 124.

The processor 121 may control overall operation of the recognition device 12.

The processor 121 may receive a control command for a target appliance from the speech processing device 11 or the control command input device 20*b* through the communication unit 122.

The processor 121 may allow the recognition module 124 to generate control information for the target appliance based on the received control command. The processor 131 may transmit the control information to the control device 13 via the communication unit 122. To this end, the communication unit 122 may include at least one communication module such as an Internet module, a mobile communication module, or the like.

According to an embodiment, the processor 121 may receive a response according to the control information from the control device 13 or receive the event information of the appliance 30 via the communication unit 122. The processor 121 may inputs the received response or event information to the recognition module 124 and the recognition module 124 may generate control information for the appliance 30 or the target appliance interworking with or associated with the appliance 30 or generate a guide message (guide information) to be provided to the user, based on the response or the event information.

The processor 121 may include at least one central processing unit (CPU), an application processor (AP), an integrated circuit, a microcontroller, an electrical unit for performing other functions or the like.

The memory 123 may store various types of information, data, and algorithms for the operation of the recognition device 12. Such a memory 123 may include a non-volatile memory and a volatile memory. The nonvolatile memory may store the various information, data, and algorithms, and the volatile memory may temporarily store data acquired during operation of the recognition device 12, or information, data, algorithms, or the like loaded from the non-volatile memory.

In addition, the memory 123 may store a user profile UP and an appliance profile AP. The user profile UP and the appliance profile AP may include information needed by the recognition module 124 to generate a control signal for a target appliance. Examples of information included in the user profile UP and the appliance profile AP have been described above with reference to FIG. 2 and the like.

The recognition module 124 may recognize an optimal setting environment of a target appliance related to the control command using an artificial intelligence-based recognition model, from the control command received from the speech processing device 11 or the control command input device 20b and generate control information for the target appliance based on a result of the recognition.

Alternatively, the recognition module 124 may recognize various situations based on the response or event information using the artificial intelligence-based recognition model, from the response received from the control device 13 or the event information of the appliance 30, generate control information for the appliance 30 or the target appliance interworking with or associated with the appliance 30 or the appliance 30, or generate a guide message (guide information) to be provided to the user.

For example, the recognition module 124 may include recognizers 125 and 127 (see FIGS. 14 and 15) with data (e.g., an artificial neural network (ANN)) previously-learned through machine learning.

The recognizers 125 and 127 will be described later in more detail with reference to FIGS. 14 and 15.

The database 40 may store various information and data related to the operation of the recognition device 12, such as the appliance usage patterns of various users or the learning data of the recognizers 125 and 127. According to an embodiment, the user profile UP and the appliance profile AP may be stored in the database 40 and the recognition device 12 may acquire the user profile UP and the appliance profile AP from the database when being operated. When the user profile UP and the appliance profile AP are stored in the database 40, the manufacturer of the appliance may conveniently update the user profile UP of the database 40 using the user's appliance purchase information. Further, the manufacturer of the appliance may also easily update the appliance profile AP such that the information of a new product is included in the appliance profile AP when the new product is released.

The external content server 50 may provide various information necessary to generate the control information or generate a guide message in the recognition module 124. For example, the external content server 50 may mean a server that provides various information such as a server (weather service providing server or the like) that provides weather information, a server that provides sound sources and image content, and the like.

The control device 13 may generate a control signal based on the artificial intelligence-based control command transmitted from the recognition device 12 and the code information of the target appliance, and may transmit the generated control signal to the appliance 30. The control device 13 may also transmit the response or event information received from the appliance 30 to the recognition device 12.

Figure 14:
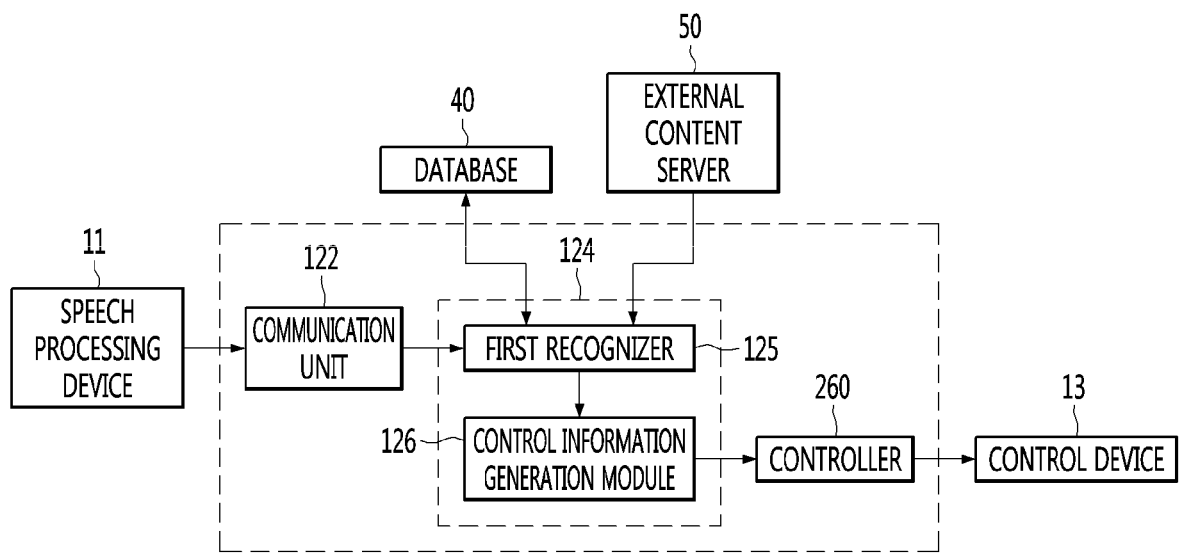
FIGS. 14 and 15 are diagrams illustrating the recognition module shown in FIG. 13 in more detail.
Figure 15:
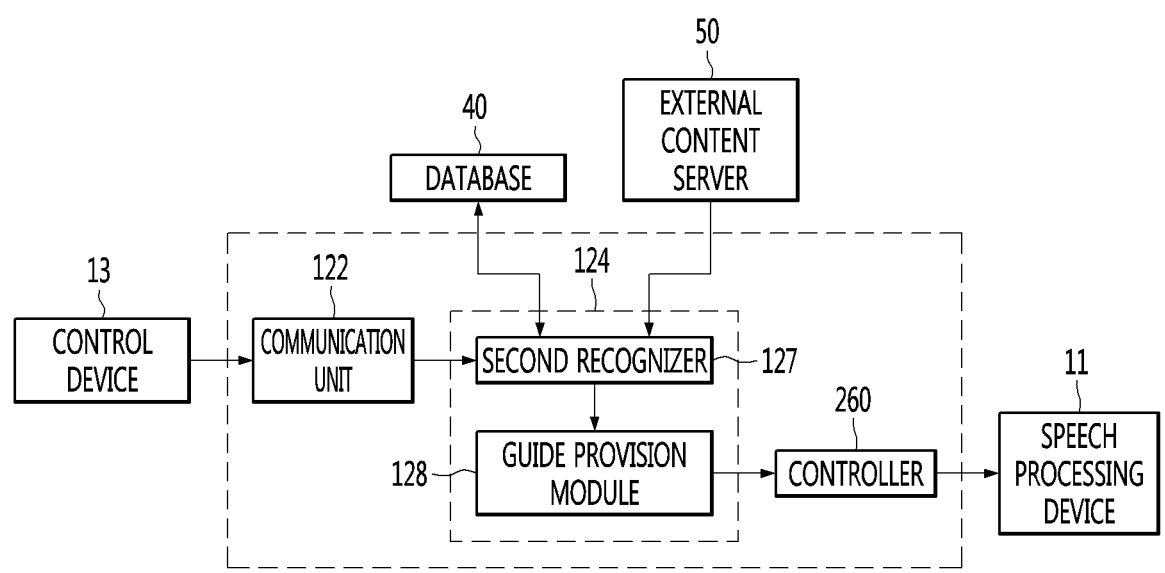

FIGS. 14 and 15 are diagrams illustrating the recognition module shown in FIG. 13 in more detail.

In the following description, the recognition module 124 is described as including a first recognizer 125 and a second recognizer 127. The first recognizer 125 and the second recognizer 127 may have different types of artificial neural network structures. However, the number of the artificial neural network structures provided in the recognition module 124 is not limited thereto, and the recognition module 124 may have more or less artificial neural network structures.

Referring to FIG. 14, the recognition module 124 may include the first recognizer 125 and the control information generation module 126.

The first recognizer 125 may include a machine learning based recognition model that is a field of artificial intelligence. The first recognizer 125 may input a control command received through the communication unit 210 to the recognition model to recognize an optimal setting environment for a target appliance of the control command.

The control command may include at least one keyword indicating identification information of the target appliance, a function or operation to be controlled, and/or a setting value upon control. On the other hand, depending on an embodiment, the control command may include a keyword related to the function of the target appliance.

The processor 121 may input at least one keyword included in the control command to the first recognizer 125.

For example, the recognition model may comprise an artificial neural network (ANN) in software or hardware form. For example, the artificial neural network may include a deep neural network (DNN) such as a convolutional neural network (CNN), a recurrent neural network (RNN), and a deep belief network (DBN) learned with deep learning.

When the control command is input, the first recognizer 125 may detect a pattern, a correlation or the like between at least one information corresponding to at least one keyword included in the input control command to form a feature map. For example, the first recognizer 125 may extract a low-level feature, an mid-level feature, and a high-level feature from at least one keyword that is input and recognize an optimal setting environment for the target appliance. The correlation, pattern, and features may have been learned from a plurality of control commands that are previously input and theirs setting environment.

According to an embodiment, the first recognizer 125 may recognize the optimal setting environment for the target appliance using external content received from the external content server 50, the user profile UP, and/or the appliance profile AP, in addition to the control command. A description related thereto will be given later in more detail with reference to FIGS. 18 to 20.

The control information generation module 126 may generate control information for controlling the operation of the target appliance based on a result of the recognition of the first recognizer 125. For example, the control information may include information on whether to activate at least one of functions or operations provided by the target appliance, and setting values for the function to be activated.

According to an embodiment, when the result of the recognition of the first recognizer 125 is provided in the form of control information for the target appliance or when the processor 121 generates the control information based on the result of the recognition, the control information generation module 126 may not be provided separately.

That is, the first recognizer 125 may function to generate the optimal control information for the target appliance from the control command input from the user.

Referring to FIG. 15, the recognition module 124 may further include a second recognizer 127 and a guide provision module 128.

The second recognizer 127 may include a machine learning-based recognition model, which is a field of artificial intelligence, like the first recognizer 125.

When event information of the appliance 30 or a response according to the control command inputted from the user are received from the control device 13, the second recognizer 127 may input the received event information or response into the recognition model to recognize a situation related to the event information or the response.

The event information may include information indicating that a specific function or operation of the appliance 30 is started/stopped/completed, information on whether an error occurs, and information on various events which have occurred in other appliances 30.

When the event information or the response is input, the second recognizer 127 may find a pattern, a correlation or the like between at least one piece of information included in the event information or response to form a feature map. For example, the second recognizer 127 may extract a low-level feature, a mid-level feature, and a high-level feature from the at least one piece of information which is inputted to recognize a situation occurring according to the event information or the response. The correlation, pattern, and features may have been learned from a plurality of control commands that are previously input and theirs setting environment.

According to an embodiment, the second recognizer 127 may recognize the situation additionally using the external content received from an external content server, a user profile UP, and/or an appliance profile AP, in addition to the event information or response. A description related thereto will be given later in more detail with reference to FIGS. 21 to 26.

The guide provision module 128 may generate a guide message for guiding the user through the information related to the recognized situation based on a result of the recognition of the second recognizer 127. For example, the guide message may include information indicating that the function or operation of the appliance 30 is started/stopped/completed, information on whether an error has occurred, and information on other events.

In addition, the guide message may include a message for providing or requesting further control of the appliance 30 or control of other target appliances interworking with or associated with the appliance 30, in relation to the situation recognized according to the event information or the response. The related embodiments will be described later with reference to FIGS. 24 to 26.

According to an embodiment, the control information generation module 126 shown in FIG. 14 may generate control information for the appliance 30 or another target appliance interworking with or associated with the appliance 30 based on the result of the recognition of the second recognizer 127. The generated control information may be transmitted to the control device 13 through the communication unit 122.

Figure 16:
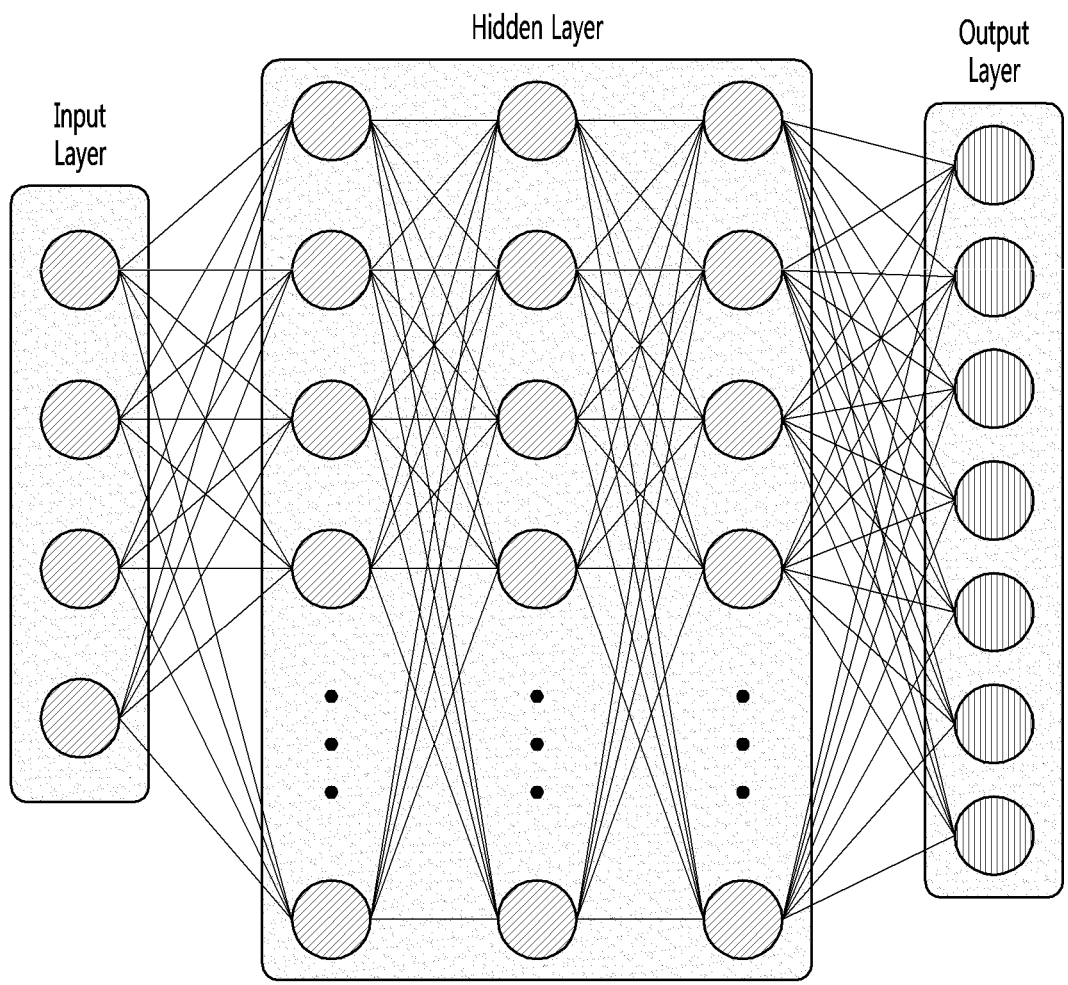
FIGS. 16 to 17 are diagrams for describing deep learning as an example of artificial intelligence applied to the first recognizer and the second recognizer of FIGS. 14 and 15.
Figure 17:
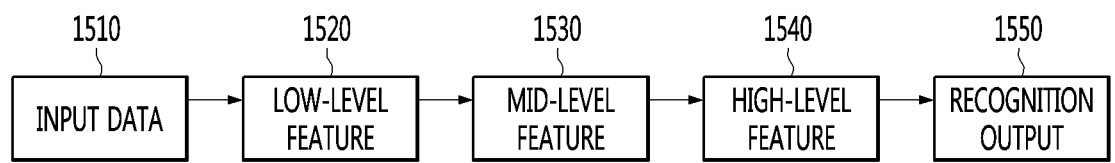

Referring to FIGS. 16 and 17, the deep learning will be described in detail as an example of the artificial intelligence technology applied to the recognizers 125 and 127 of the recognition module 124.

FIGS. 16 to 17 are diagrams for describing deep learning as an example of artificial intelligence applied to the first recognizer and the second recognizer of FIGS. 14 and 15.

Artificial intelligence is a field of computer engineering and information technology that studies a method for enabling computers to do thinking, learning, and self-development which human is capable of doing by intelligence. Machine learning, which is one of the research fields of artificial intelligence, may mean a system that performs prediction based on empirical data and improves its own performance through learning. Deep learning technology, which is a class of machine learning algorithms, is to perform learning using multiple layers to progressively extract higher level features from raw input.

Deep learning may represent a set of machine learning algorithms that extract key data from multiple data as the step is increased.

The deep learning structure may include an artificial neural network (ANN), for example, the deep learning structure may be composed of deep neural networks such as a convolutional neural network (CNN), a recurrent neural network (RNN), a deep belief network (DBN).

Referring to FIG. 16, the artificial neural network may include an input layer, a hidden layer, and an output layer. Each of the layers may contain a plurality of nodes, and each of the layers is associated with the next layer. The nodes between adjacent layers may be connected to each other with weights.

Referring to FIG. 17, a computing device (machine) may form a feature map by finding a certain pattern from input data 1510 that is inputted. For example, the computing device (machine) may extract a mid-level feature 1530 and a high-level feature 1540 from a low-level feature 1520 to recognize an object and output a result 1550 thereof.

The artificial neural network may be abstracted into high-level features as it goes to the next layer.

Referring to FIGS. 16 and 17, each node may operate based on an activation model, and an output value corresponding to an input value may be determined according to the activation model.

The output value of a certain note, for example, the low-level feature 1520, may be input to the next layer associated with the node, for example, a node of the mid-level feature 1530. A node of the next layer, for example, a node of the mid-level feature 1530, may receive values output from a plurality of nodes of the low-level feature 1520.

In this case, the input value of each node may be a value obtained by applying a weight to the output value of a node of the previous layer. The weight may mean the link strength between nodes.

Further, the deep learning process may be seen as a process of finding out an appropriate weight.

On the other hand, the output value of a certain node, for example, the mid-level feature 1530 may be input to the next layer associated with the node, for example, a node of the high-level feature 1540. A node of the next layer, for example, a node of the high-level feature 1540, may receive values output from a plurality of nodes of the mid-level feature 1530.

The artificial neural network may extract feature information corresponding to each level, using a learned layer corresponding to each level. The artificial neural network may sequentially perform abstraction and then recognize a predetermined object using the feature information of the highest level.

For example, in a face recognition process by deep learning, a computer may distinguish between bright pixels and dark pixels according to the brightness of pixels in an input image, identify simple shape such as a border and an edge, and then identify a more complicated shape and object. Finally, the computer may figure out a shape that defines a human face.

The deep learning structure according to the present invention may utilize various known structures. For example, the deep learning structure according to the present invention may be a Convolutional Neural Network (CNN), a Recurrent Neural Network (RNN), a Deep Belief Network (DBN), or the like.

The Recurrent Neural Network (RNN) is widely used in natural language processing, and may construct an artificial neural network structure by stacking layers at each moment, which is an effective structure for processing of time-series data that varies with time.

The Deep Belief Network (DBN) is a deep-learning structure consisting of multiple layers of RBM Restricted Boltzman Machine (RBM) that is the deep learning scheme. When the Restricted Boltzman Machine (RBM) learning is repeated and a certain number of layers are generated, a Deep Belief Network (DBN) having a number of layers may be constructed.

The Convolutional Neural Network (CNN) is a model that simulates a person's brain function based on the assumption that when recognizing an object, a person extracts the basic features of the object, then undergoes complicated calculations in the brain and recognizes the object based on the result of the calculations.

On the other hand, the artificial neural network learning may be achieved by adjusting the weight of the inter-node interconnections (adjusting the bias value if necessary) such that the desired output is obtained for a given input. Also, the artificial neural network may continuously update the weight value by learning. Further, back propagation may be used for the artificial neural network learning.

Meanwhile, the memory 123 may store data for learning the artificial neural network. In addition, according to an embodiment, the memory 123 may store weights and biases constituting the artificial neural network structure. Alternatively, according to an embodiment, the weights and the biases constituting the artificial neural network structure may be stored in the embedded memory of the recognition module 124.

On the other hand, each time the control command is acquired from the speech processing device 11 or the control command input device 20b and the corresponding control information is recognized, the recognition module 124 may perform the learning process of the first recognizer 125 using the acquired control command and control information. The recognition module 124 may perform a learning process of the second recognizer 127 every time the event information of the appliance 30 or the response according to the control command is acquired from the control device 13 and a situation corresponding thereto is recognized. As the learning process is performed, the artificial neural network structure such as weights may be updated.

Alternatively, the learning process may be performed in another device connected to the recognition device 12, and the recognition device 12 may receive data related to machine learning from the another device. In this case, the recognition device 12 may update the first recognizer 125 and/or the second recognizer 127 of the recognition module 124 based on the data associated with the received machine learning.

Various examples related to the operation of the appliance control system provided with the recognition device 12 according to an embodiment of the present invention will be described below with reference to FIGS. 18 to 26.

Figure 18:
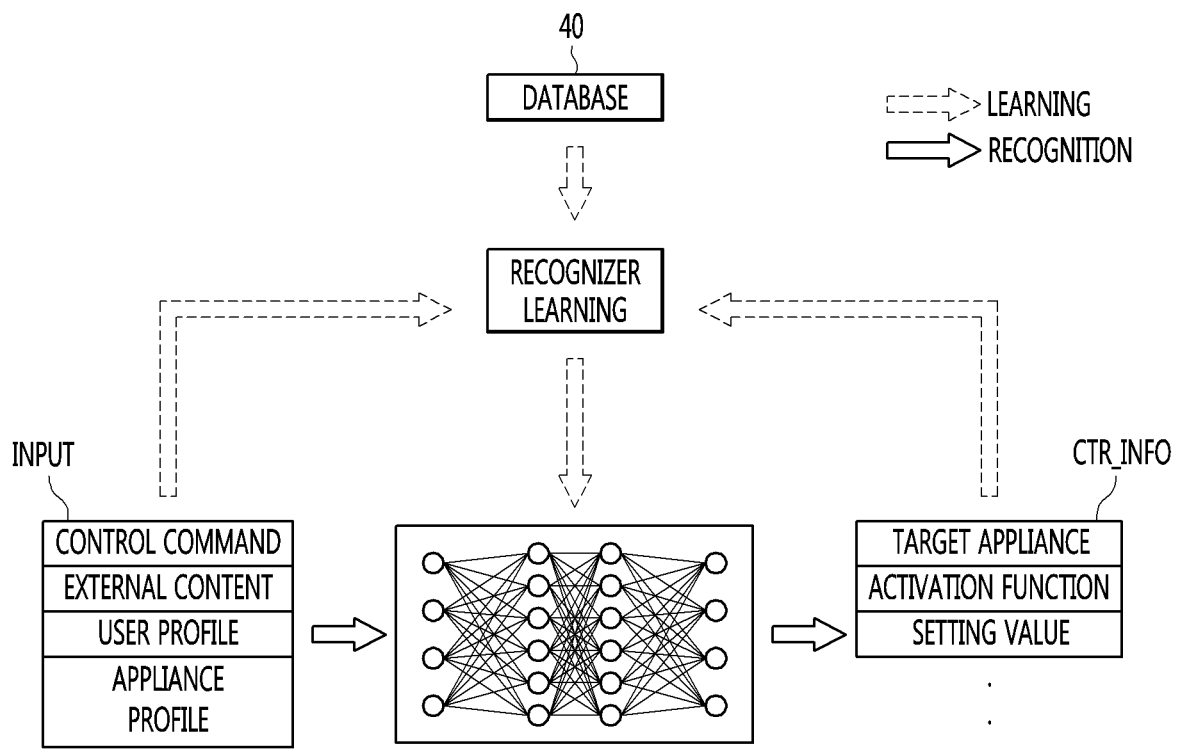
FIG. 18 is a diagram for describing a recognition operation and a learning operation of the first recognizer shown in FIG. 14.

FIG. 18 is a diagram for describing a recognition operation and a learning operation of the first recognizer shown in FIG. 14.

Referring to FIG. 18, when the control command is input from the speech processing device 11 or the control command input device 20b, the first recognizer 125 may recognize an optimal setting environment for a target appliance and output a result of the recognition based on the input control command. According to an embodiment, in addition to the control command, external content received from the external content server 50, the user profile UP, and/or the appliance profile AP may be input to the first recognizer 125. For example, the user profile UP input to the first recognizer 125 may include a usage pattern of the user for the target appliance, an operation history, and the like. In addition, the appliance profile AP input to the first recognizer 125 may include information on functions (usable functions) supported by the model of the target appliance, or the like.

In FIG. 18, it is assumed that the output result of recognition corresponds to the control information CTR_INFO for convenience of description. For example, the control information CTR_INFO may include various information related to control of the target appliance, such as identification information of the target appliance, information on a function activated (or deactivated) according to the setting environment, information on a setting value or a control value of the function.

According to an embodiment, the first recognizer 125 may output a single recognition result as a final recognition result, but it is also possible to repeatedly or continuously perform a plurality of recognition operations and output a final recognition result based on a plurality of recognition results, thus improving the recognition accuracy.

On the other hand, the first recognizer 125 may collect the received control command, and perform learning of the first recognizer 125 using features extracted from the collected control command and the result of the recognition of the optimal setting environment for the target appliance. Through the learning, the parameters (weight and bias) of the artificial neural network included in the first recognizer 125 may be updated. The collected control command may be stored in the embedded memory of the memory 123 or the recognition module 124 of the recognition device 12 or may be stored in the database 40.

Meanwhile, according to an embodiment, the learning operation may be performed in a separate learning server connected to the recognition device 12. In this case, the learning server may perform the learning operation based on the control command and the recognition result received from the recognition device 12. Such a learning server may include an artificial neural network, such as CNN, RNN, DBN, or the like, as described with reference to FIGS. 4 and 5. As a learning method, both unsupervised learning and supervised learning may be used.

The learning server may transmit learning data updated according to the performance of the learning operation to the recognition device 12 and the recognition device 12 may update the artificial neural network structure included in the first recognizer 125 to be the learned structure based on the received learning data.

Figure 19:
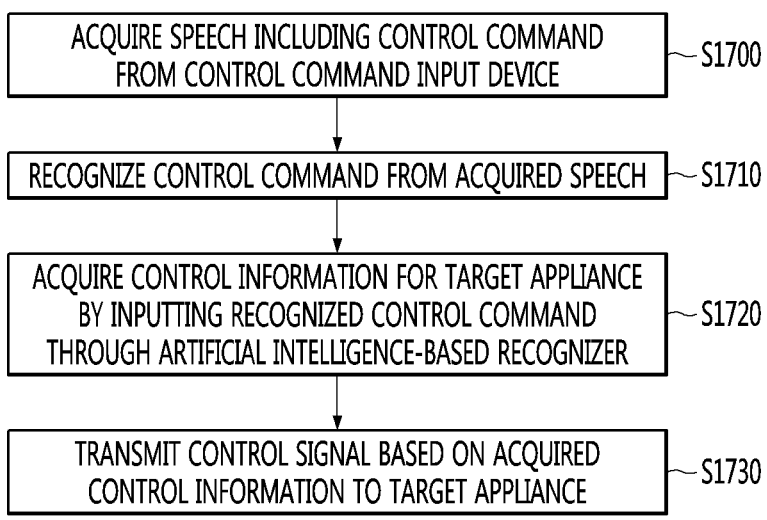
FIG. 19 is a flowchart for describing an example of an appliance control operation of an artificial intelligence-based appliance control apparatus.

FIG. 19 is a flowchart for describing an example of an appliance control operation of an appliance control apparatus based on artificial intelligence.

Referring to FIG. 19, the appliance control apparatus 10b may acquire a speech including a control command from the control command input device 20a (S1700), and recognize the control command from the obtained speech (S1710). Steps S1700 and S1710 are substantially the same as steps S605 and S610 of FIG. 6, and a detailed description thereof will be omitted.

The appliance control apparatus 10b may input the recognized control command to a artificial intelligence-based recognizer (e.g., the first recognizer 125) to acquire a control information for a target appliance (S1720).

The recognition device 12 may receive the recognized control command from the speech processing device 11. According to an embodiment, the recognition device 12 may receive a control command from the control command input device 20b.

The recognition module 124 of the recognition device 12 may input the received control command to the first recognizer 125. The first recognizer 125 may recognize an optimal setting environment for the target appliance from the input control command using an artificial intelligence-based recognition model (e.g., an artificial neural network structure). The recognition module 124 may generate control information for the target appliance based on the recognized setting environment.

According to an embodiment, the recognition module 124 may provide external content received from the external content server 50, a user profile UP, and/or an appliance profile AP to the first recognizer 125 in addition to the control command, to recognize the optimal setting environment.

The appliance control apparatus 10b may transmit a control signal based on the obtained control information to the target appliance (S1730).

The recognition device 12 may transmit control information for the target appliance to the control device 13.

The control device 13 may generate a control signal for the target appliance based on the received control information, and transmit the generated control signal to the target appliance. For example, based on the target appliance model information (or the identification information) included in the control information, and the information on the function or operation to be activated or deactivated, the control device 13 may acquire code information corresponding to the function or operation of the target appliance from an appliance profile AP. To this end, the appliance profile AP may also be stored in the control device 13. Alternatively, the recognition device 12 may transmit information related to the target appliance among the appliance profile AP stored in the memory 123 to the control device 13 together with the control information.

Like the embodiments of FIGS. 10 to 11, a target appliance without a communication module may be connected to the control command input device 20 (e.g., the portable speech input device 21a). In this case, the control device 13 may transmit the generated control signal to the target appliance through the control command input device 20. To this end, the user profile UP may include information indicating a state in which the target appliance is connected to the control command input device 20. The recognition device 12 may transmit the information to the control device 13 and the control device 13 may transmit the control signal to the control command input device 20 based on the received information.

Figure 20:
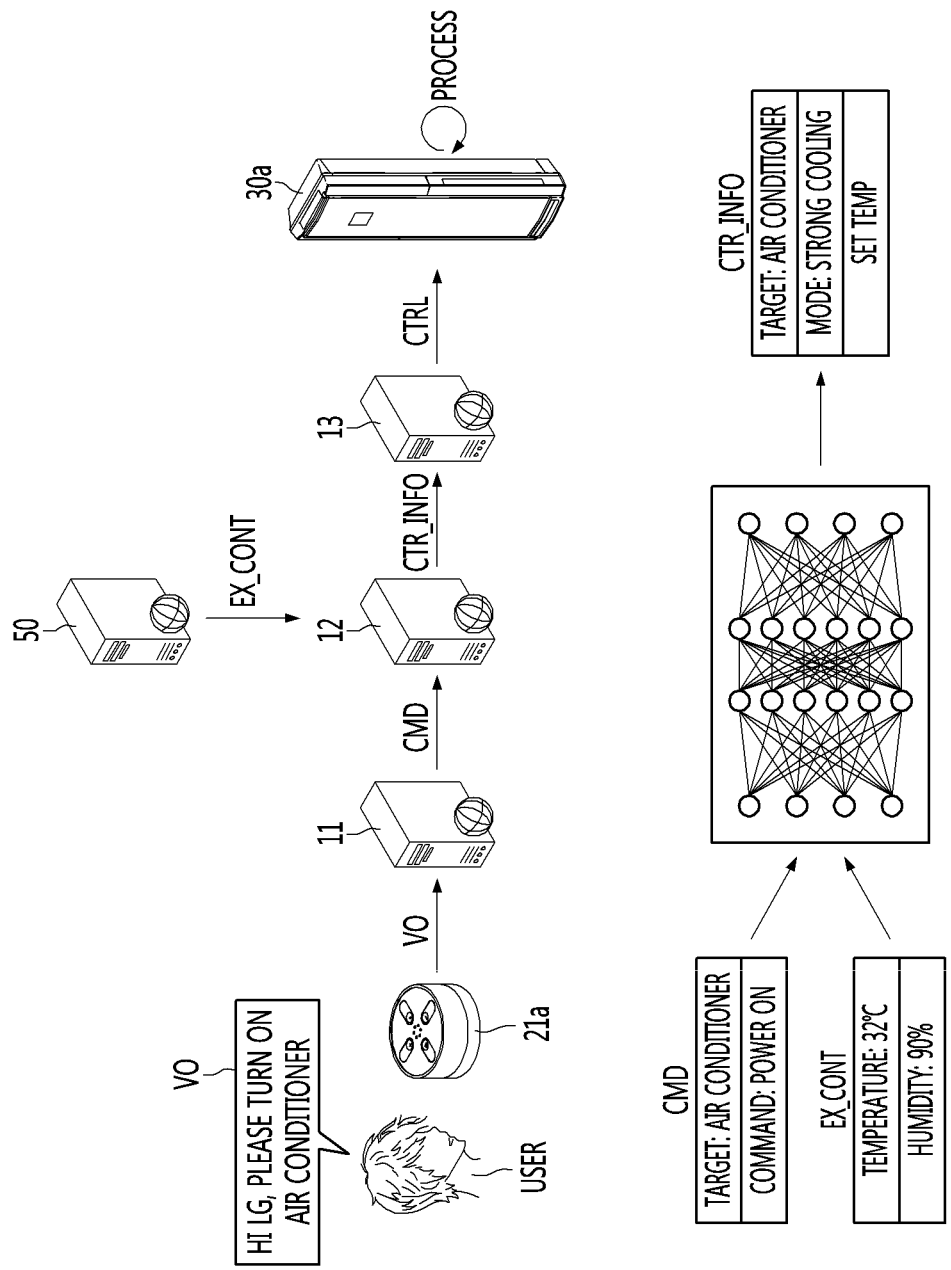
FIG. 20 is an exemplary diagram related to a control operation shown in FIG. 19.

FIG. 20 is an exemplary diagram related to the control operation shown in FIG. 19.

Referring to FIG. 7, when a user USER is present at a position away from an air conditioner 30a, the user USER may input speech (VO) corresponding to "Hi-LG, please turn on the air conditioner" using the control command input device (e.g., the portable speech input device 21a) held by the user USER or disposed at a position adjacent to the user USER. In this case, the user may operate the speech input button 223a in inputting the speech VO.

The portable speech input device 21a may transmit the received speech VO to the speech processing device 11.

The ASR module 111 of the speech processing device 11 may convert the received speech VO into text and the NLP module 113 may recognize that the user commands the 'air conditioner' to 'be turned on'. Based on a recognition result, the NLP module 113 may transmit a control command CMD for performing control to set a target appliance to the 'air conditioner' and to turn on the power supply of the air conditioner 30a to the recognition device 12.

The recognition device 12 may input the received control command CMD to the first recognizer 125. The recognition device may also input external content EX_CONT received from the external content server 50 to the first recognizer 125. For example, the external content EX_CONT may include information indicating that an outdoor temperature is '32° C.' and an outdoor humidity is '90%'.

Although not shown, the recognition device 12 may include information on the usage pattern of the air conditioner 30a which is included in the user profile UP, and/or information on mode information supported by the model of the air conditioner 30a which is included in the user profile UP may be input to the first recognizer 125 together.

The recognition model (artificial neural network) provided in the first recognizer 125 may recognize the optimal setting environment for the target appliance (the air conditioner 30a) from the control command CMD and the external contents EX_CONT which are inputted. For example, the optimal setting environment for the air conditioner 30a may correspond to a 'strong cooling mode' of a set temperature '26° C.'. The control information generation module 126 of the recognition device 12 may generate control information CTR_INFO indicating that the target appliance is the air conditioner 30a, the operation mode is the 'strong cooling mode' and the set temperature is '26° C.' based on a result of the recognition.

Unlike the embodiment illustrated in FIG. 6, although the information on the set temperature of the air conditioner 30a is not included in the user's control command CMD, the recognizing device 12 may recognize the optimal setting environment for the air conditioner 30a and generate the information on the set temperature through the artificial intelligence-based first recognizer 125.

The control device 13 may receive the control information CTR_INFO from the recognition device and generate a control signal CTRL based on the received control information CTR_INFO. The control device 13 may transmit the generated control signal CTRL to the air conditioner 30a among appliances owned by the user. The air conditioner 30a may receive the control signal CTRL and operate in the strong cooling mode of the set temperature of 26° C. based on the code information contained in the received control signal CTRL (PROCESS) to process the control signal CTRL.

like FIGS. 10 and 11, the air conditioner 30a is not provided without a communication module and the portable speech input device 21a may connected to the air conditioner 30a (e.g., a USB interface or a short-range wireless communication method). In this case, the control device 13 may transmit the control signal CTRL to the portable speech input device 21a, and the portable speech input device 21a may transmit the received control signal CTRL to the air conditioner 30a.

Figure 21:
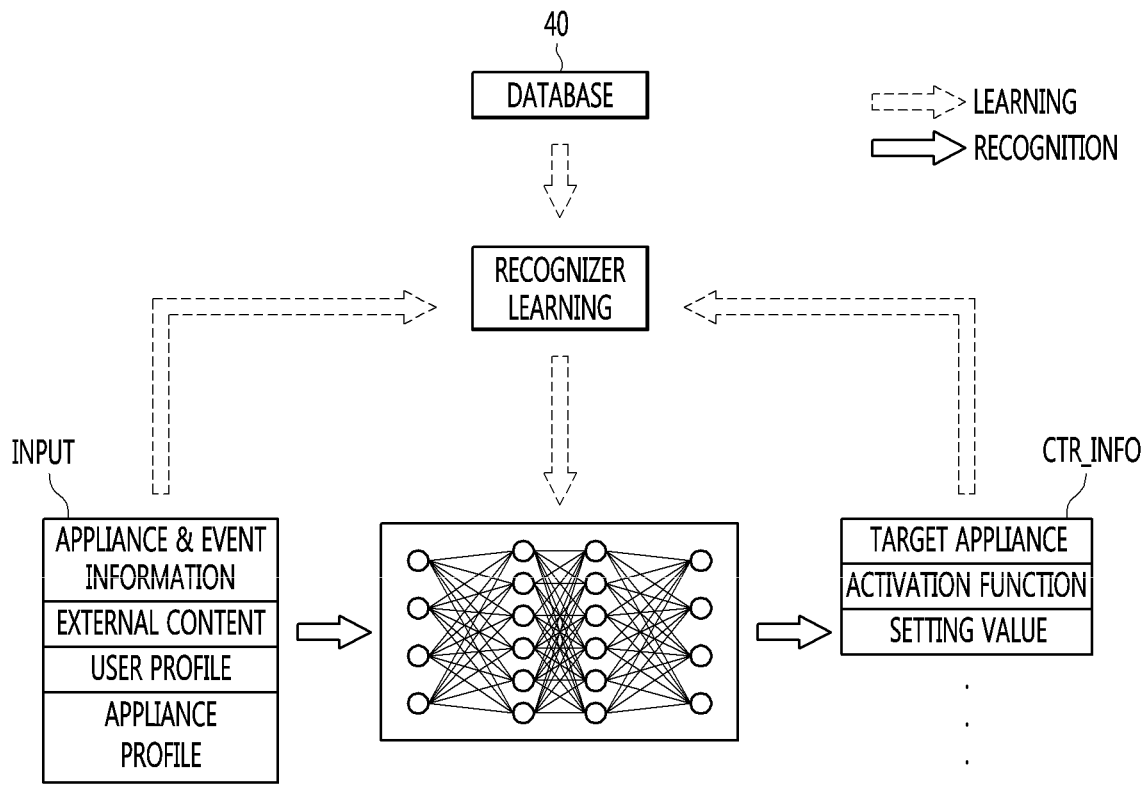
FIG. 21 is a view for explaining a recognition operation and a learning operation of a second recognizer shown in FIG. 15.

FIG. 21 is a diagram for describing a recognition operation and a learning operation of the second recognizer shown in FIG. 15.

Referring to FIG. 21, when event information of an appliance is input from the control device 13, the second recognizer 127 may recognize a situation related to the input event information, as described above with reference to FIG. 15. According to an embodiment, external content received from the external content server 50, a user profile UP, and/or an appliance profile AP may be input to the second recognizer 127 in addition to the event information. For example, the user profile UP input to the second recognizer 127 may include information such as usage patterns and operation histories for the appliance and other appliances interworking with or associated with the appliance. Also, the appliance profile AP input to the second recognizer 127 may include information on functions supported by models owned by the user, among the appliance and other appliances interworking with or associated with the appliance.

An embodiment will be described with reference to FIG. 21, in which the recognition device 12 generates control information CTR_INFO for a target appliance interworking with the appliance based on result of the recognition of the second recognizer 127. On the other hand, the recognition device 12 may generate a guide message to be provided to a user based on a result of the recognition of the second recognizer 127, as described above with reference to FIG. 15.

For example, the control information CTR_INFO may include various information related to control of a target appliance such as identification information of the target appliance, information on a function to be activated (or deactivated) according to a recognized situation, information on a setting value or a control value for the function, or the like. On the other hand, a plurality of target appliances may be controlled based on the recognized situation, and in this case, the recognition device 12 may generate control information for each of the plurality of target appliances.

According to an embodiment, the second recognizer 127 may output a single recognition result as a final recognition result, but it is also possible to repeatedly or continuously perform a plurality of recognition operations and output a final recognition result based on a plurality of recognition results, thus improving the recognition accuracy.

On the other hand, the second recognizer 127 may collect received input INPUT, and perform learning of the second recognizer 127 using the features extracted from the collected input INPUT and a result of the situation recognition according to the event information. Through the learning, the parameters (weight and bias) of the artificial neural network included in the second recognizer 127 may be updated. The collected control command may be stored in the embedded memory of the memory 123 or the recognition module 124 of the recognition device 12 or may be stored in the database 40.

Figure 22:
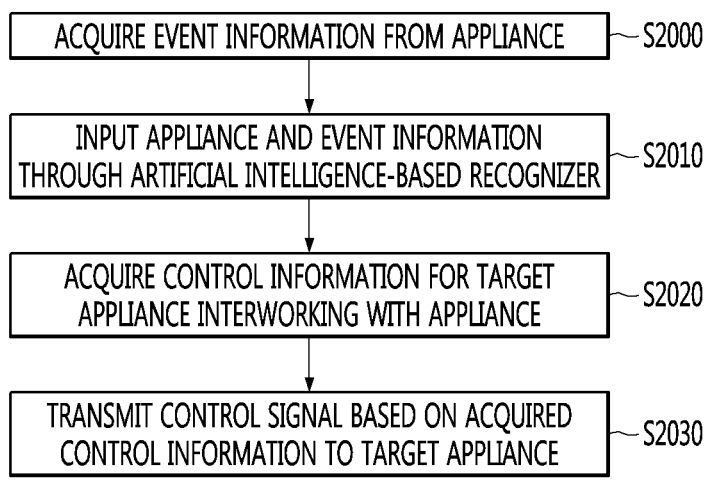
FIG. 22 is a flowchart for describing another example of the appliance control operation of the artificial intelligence-based appliance control apparatus.

FIG. 22 is a flowchart for describing another example of an appliance control operation of an appliance control apparatus based on artificial intelligence.

Referring to FIG. 22, the appliance control apparatus 10b may acquire event information from the appliance 30 (S2000), and input information on the appliance 30 and the event information to an artificial intelligence-based recognizer (e.g., the second recognizer 127) (S2010).

When an event such as start/stop/completion of a specific function or operation or an event, such as occurrence of an abnormal situation, occurs, the appliance 30 may transmit event information corresponding to the event to the control device 13. According to an embodiment, when the appliance 30 is connected to the control command input device 20 (e.g., the portable speech\input device 21a), the appliance 30 may transmit the event information to the control device 13 via to the control command input device 20.

The control device 13 may transmit the received event information to the recognition device 12. The recognition module 124 of the recognition device 12 may input the received event information and the information on the appliance 30 that transmits the event information to the second recognizer 127.

The second recognizer 127 may recognize a situation related to the event from the input control command using an artificial intelligence-based recognition model (e.g., an artificial neural network structure). The recognition module 124 may generate control information for the target appliance based on the recognized setting environment.

According to an embodiment, the recognition module 124 may provide external content received from the external content server 50, a user profile UP, and/or an appliance profile AP to the second recognizer 127 in addition to the event information and the appliance information, to recognize a situation related to the event.

The appliance control apparatus 10b may acquire control information on a target appliance interworking with the appliance 30 based on the result of recognition of the recognizer (S2020).

For example, the situation recognized by the second recognizer 127 may be a situation in which control of the target appliance associated with an event occurring in the appliance 30 is required.

In this case, the second recognizer 127 may output the setting environment of the target appliance as the recognition result, and the control information generation module 126 may generate control information for the target appliance based on the setting environment.

The appliance control apparatus 10b may transmit a control signal based on the acquired control information to the target appliance (S2030).

The step S2030 is similar to the step S1730 of FIG. 19, and a description thereof will be omitted.

In other words, according to the embodiment shown in FIG. 22, the recognizing device 12 may recognize, from the event occurring in the specific appliance, which it is necessary to control another appliance interworking with or associated with the event, based on the artificial intelligence. The recognition device 12 may automatically control the another appliance based on the recognition result, thereby maximizing the user's convenience.

FIG. 23 is an exemplary diagram related to the control operation shown in FIG. 22.

Referring to FIG. 23, the washing machine 30d operates in a comforter mode to perform laundry washing. When the operation of the comforter mode is completed, the washing machine 30d may transmit event information EVENT indicating that the operation of the comforter mode is completed to the control device 13. According to an embodiment, when the washing machine 30d without a communication module is connected to the portable speech input device 21a, the washing machine 30d may transmit the event information EVENT to the control device 21a via the portable speech input device 21a.

The control device 13 may transmit the event information EVENT received from the washing machine 30d or the portable speech input device 21a or event information EVENT_INFO acquired by processing the event information EVENT to the recognition device 12. For example, the event information EVENT_INFO may include appliance information (washing machine) in which an event has occurred and the event (completion of the comforter mode) occurring in the appliance.

The recognition device 12 may input the received event information EVENT_INFO to the second recognizer 127. The recognition device 12 may also input external content EX_CONT received from the external content server 50 to the second recognizer 127. For example, the external content EX_CONT may include environmental information indicating an outdoor humidity of '90%' and a fine dust state indicating 'poor'.

Although not shown, the recognition device 12 may input, to the second recognizer 127, information related to the washing machine 30d or other appliances associated with the washing machine 30d which is included in the user profile UP, and/or information on functions or modes supported by the washing machine 30d or the other appliances associated with the washing machine 30d which is included in the user profile UP together.

A recognition model (artificial neural network) provided in the second recognizer 127 may recognize a situation related to the event from the input event information EVENT_INFO and the external content EX_CONT. For example, the second recognizer 127 may recognize that when the comforter mode of the washing machine 30d is completed, the outdoor humidity is 90%, and the fine dust state is 'poor', it is necessary to operate the drying machine 30e.

The control information generation module 126 of the recognition device 12 may generate control information CTR_INFO indicating that the target appliance is the drying machine 30e, the operation mode is the 'comforter mode' based on a result of the recognition.

The control device 13 may receive the control information CTR_INFO from the recognition device 12 and generate a control signal CTRL based on the received control information CTR_INFO. For example, when the drying machine 30e supports the 'comforter mode', the control device 13 may generate a control signal CTRL including code information corresponding to the 'comforter mode'. On the other hand, according to an embodiment, when the drying machine 30e does not support the 'comforter mode', the control device 13 may generate a control signal CTRL including code information corresponding to a mode capable of replacing the 'comforter mode' among other modes supported by the drying machine 30e.

Instead of the control device 13, the control information generation module 126 may identify modes supported by the drying machine 30e according to an embodiment. In this case, the control information generation module 126 may generate the control information CTR_INFO indicating the mode capable of replacing the 'comforter mode' when the drying machine 30e does not support the 'comforter mode'.

The control device 13 may transmit the generated control signal CTRL to the drying machine 30e (or the portable speech input device 21a connected to the drying machine 30e) among appliances owned by the user. The drying machine 30e may receive the control signal CTRL from the control device 13 or the portable speech input device 21a and may be on stand-by in a state in which an operation mode is automatically set to the 'comforter mode' based on the code information included in the received control signal CTRL. The user may put the laundry contained in the washing machine 30d into the drying machine 30e and operate a start button of the drying machine 30e, thus conveniently using the drying machine 30e.

Figure 24:
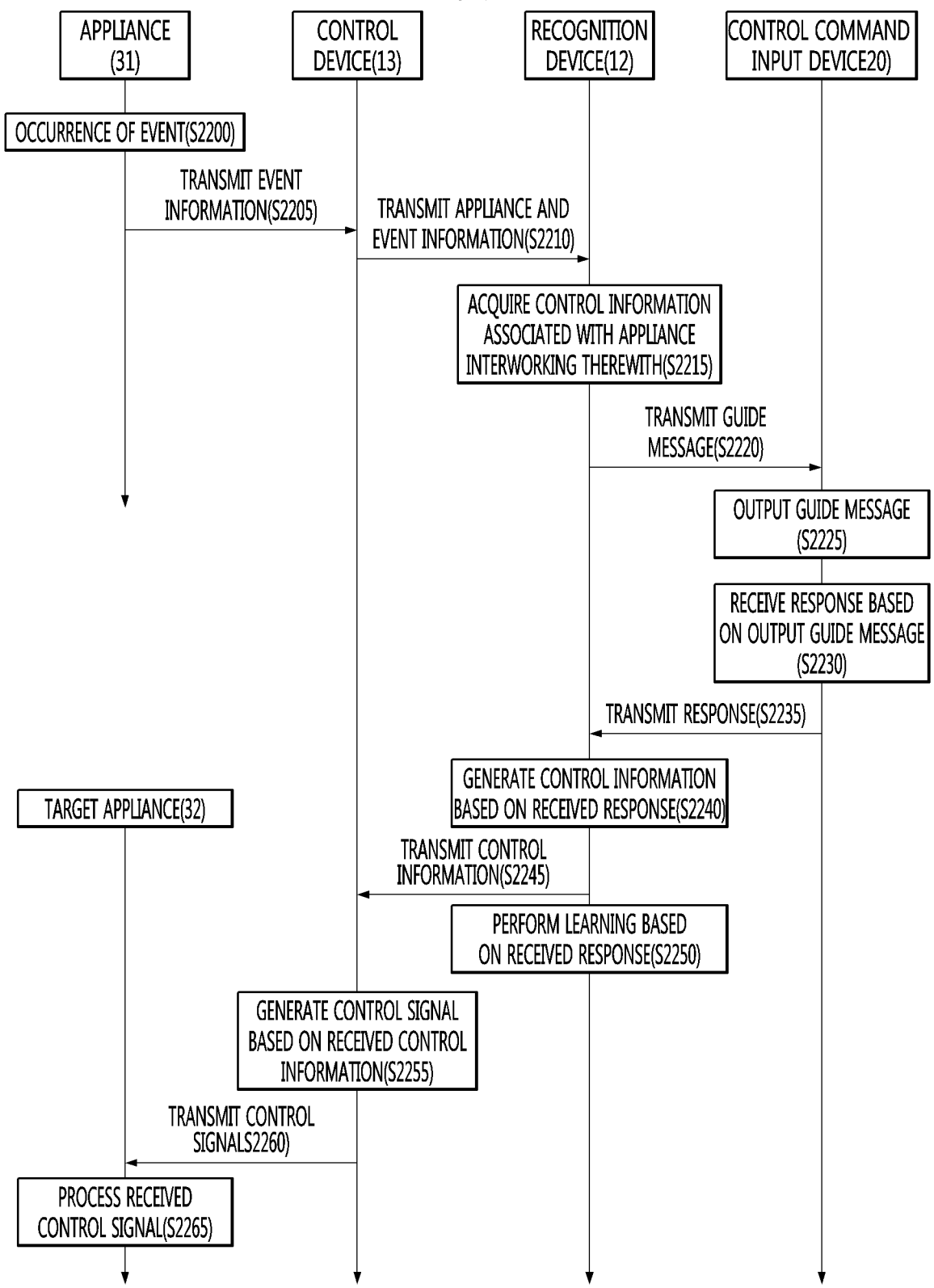
FIG. 24 is a ladder diagram for describing still another example of the appliance control operation of the artificial intelligence-based appliance control apparatus.

FIG. 24 is a ladder diagram for describing another example of an appliance control operation of an appliance control apparatus based on artificial intelligence.

Referring to FIG. 24, the appliance 31 may transmit event information to the control device 13 when an event occurs (S2200, S2205). The control device 13 may transmit appliance information and event information to the recognition device 12 based on the received event information (S2210).

The recognition device 12 may recognize a situation related to the event based on the received appliance information and event information. For example, when the recognition result is a situation in which control for a target appliance 32 associated with the event is required, the recognition device 12 may acquire control information for the target appliance 32 based on the recognition result (S2215).

Steps S2200 to S2215 may be similar to the embodiment described above with reference to FIGS. 22 and 23.

Thereafter, unlike the embodiment shown in FIGS. 22 and 23, the recognition device 12 may generate a guide message based on the recognized situation or a guide message based on the control information, and output the generated guide message to the control command input device 20 (S2220).

For example, the guide provision module 178 may generate a guide message indicating that the target appliance 32 is required to operate based on the recognized situation or the control information.

The recognition device 12 may transmit the generated guide message to the speech processing device 11 or the control command input device 20b. The speech processing device 11 may generate a speech including the received guide message and transmit the generated speech to the control command input apparatus 20a.

The control command input device 20 may output the received guide message in the form of for example, speech, text or graphic through the output unit 230 (S2225), and receive a response based on the output guide message from the user (S2230). The control command input device 20 may transmit the received response to the recognition device 12 (S2235).

For example, when the control command input device 20 is the portable speech input device 21a, the portable speech input device 21a may output the guide message received from the speech processing device 11 via the speaker 231 with speech. The portable speech input device 21a may receive the user's response based on the output speech through the microphone 221 in a speech form.

The control command input device 20 may transmit the received response directly to the recognition device 12 or to the recognition device 12 via the speech processing device 11. For example, the portable speech input device 21a may transmit the response of the user received in the form of speech to the speech processing device 11. The speech processing device 11 may convert the received speech into a text form or the like and transmit the response in the converted form to the recognition device 12.

The recognition device 12 may generate control information for the target appliance 32 based on the received response (S2240).

For example, when the received response corresponds to agreement or acceptance of the guide message, or indicates the same control information as the control information acquired in step S2215, the recognition device 12 may generate the same control information as that in step S2215.

On the other hand, when the received response indicates control information different from the control information included in the guide message, the recognition device 12 may regenerate control information on the target appliance 32 based on the received response.

According to an embodiment, transmission of the guide message and reception of the response may be performed step by step a plurality of times. This will be described later with reference to FIGS. 25 and 26.

The recognition device 12 may transmit the generated control information to the control device 13 (S2245). Meanwhile, the recognition device 12 may update an artificial neural network structure to correspond to the user's intention by performing a learning operation based on the received response (S2250). The control device 13 may generate a control signal based on the received control information (S2255), and transmit the generated control signal to the target appliance 32 (S2260). The target appliance 32 may process the received control signal (S2265).

That is, the appliance control apparatus 10*b* may recognize a situation associated with an event occurring at a particular appliance using the recognition device 12 and intelligently control the operation of the appliance or another appliance based on the recognized situation. Thus, it is possible to maximize the satisfaction of the user with respect to a service provided by the appliance control apparatus.

In addition, the appliance control apparatus 10*b* may provide an appliance control service that accurately reflects the user's intention through interaction with the user using the recognition device 12.

Figure 25:
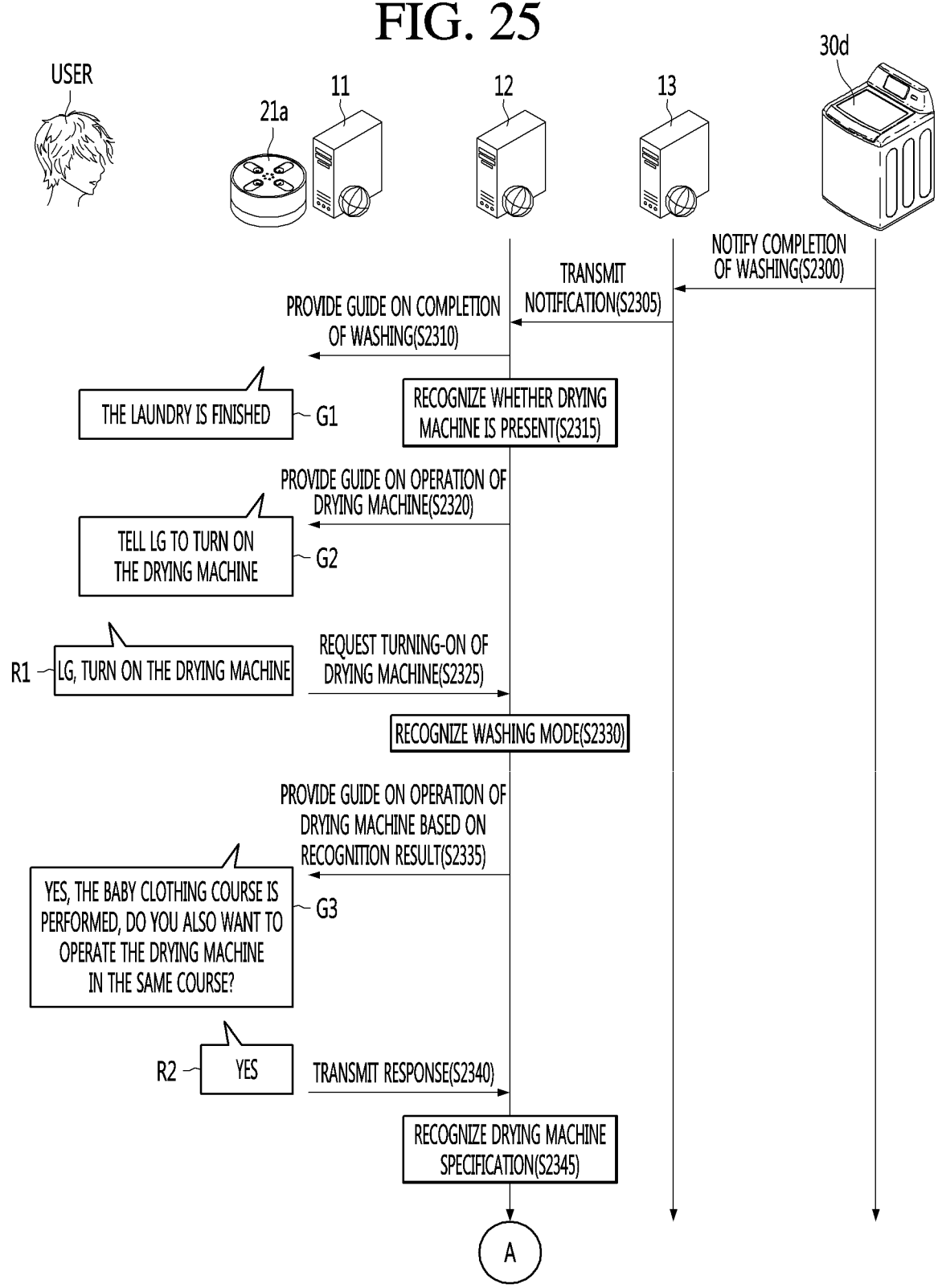
FIGS. 25 to 26 are diagrams for describing a specific embodiment related to the control operation of FIG. 24.
Figure 26:
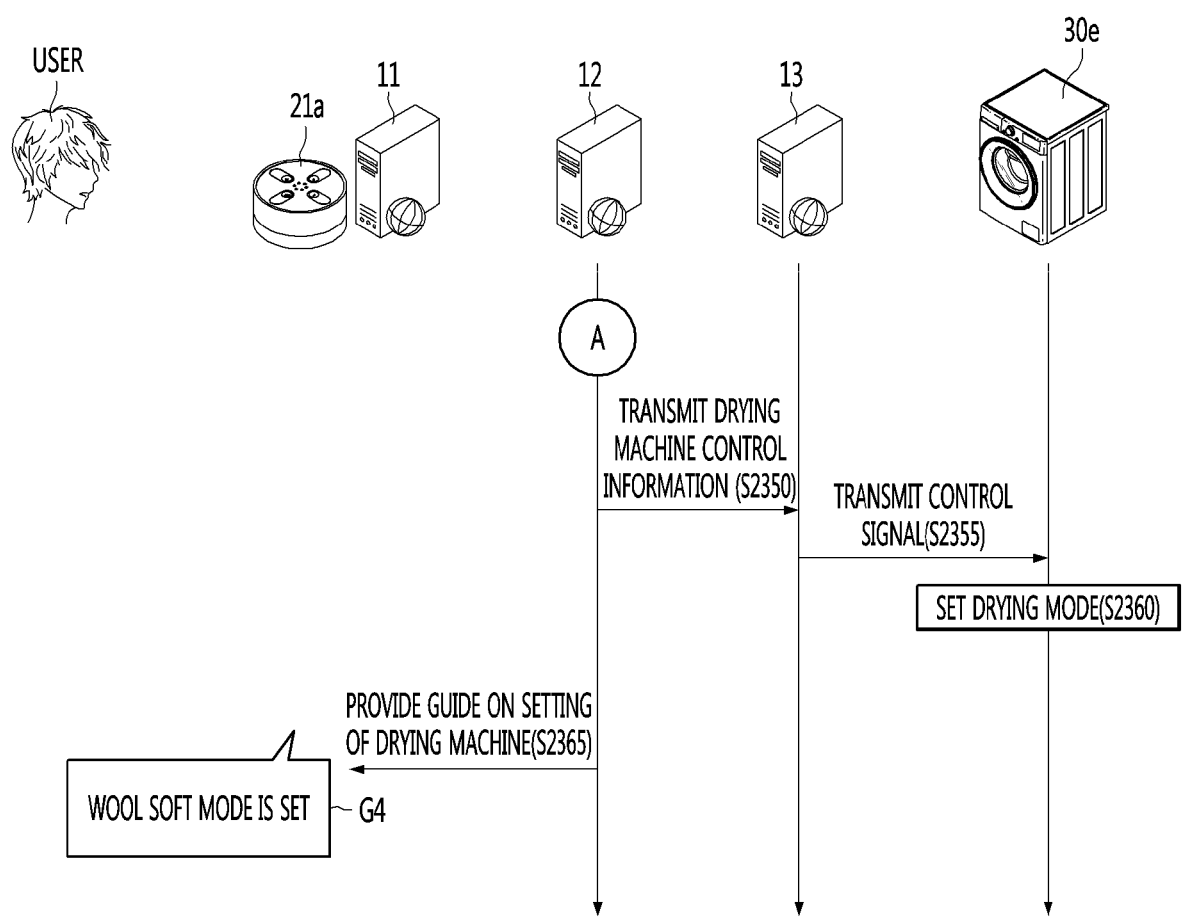

FIGS. 25 and 26 are diagrams for describing a specific embodiment related to the control operation of FIG. 24.

In FIGS. 25 and 26, a description will be given under the assumption that the control command input device 20 is the portable speech input device 21*a*.

Referring to FIG. 25, when the washing mode is terminated, the washing machine 30*d* may transmit event information informing the completion of washing to the recognition device 12 through the control device 13 (S2300, S2305). When the washing machine 30*d* is connected to the portable speech input device 21*a*, the washing machine 30*d* may transmit the event information to the portable speech input device 21*a*, and the portable speech input device 21*a* may transmit the event information to the recognition device 12 via the control device 13.

The recognizing device 12 may inform the user that the washing has been completed through the portable speech input device 21*a* based on the received event information (S2310).

For example, the speech processing device 11 may generate first speech G1 reporting the completion of washing based on the guide message received from the recognition device 12, and transmit the generated first speech G1 to the portable speech input device 21*a*. The portable speech input device 21*a* may output the received first speech G1 through the speaker 231.

On the other hand, the recognizing device 12 may recognize that it is necessary to operate the drying machine 30*e* based on the event information, and recognize whether the user possesses a drying machine (S2315). For example, the recognition device 12 may recognize whether the drying machine is present through the second recognizer 127 or recognize whether the drying machine is present based on the user profile UP.

When the user possesses the drying machine 30*e*, the recognition device 12 may transmit a guide message to provide guide on the operation of the drying machine 30*e* to the speech processing device 11 (S2320).

The speech processing device 11 may generate second speech G2 for asking the user to determine whether to operate the drying machine 30*e* based on the received guide message and transmit the generated second speech G2 to the portable speech input device 21*a*). The portable speech input device 21*a* may output the received second speech G2 through the speaker 231.

The user may determine whether to use the drying machine 30*e* based on the output second speech G2. When the user wants to use the drying machine 30*e*, the user may input a first response R1 requesting operation of the drying machine to the portable speech input device 21*a*. The portable speech input device 21*a* and the speech processing device 11 may transmit a request to operate the drying machine 30*e* to the recognition device 12 based on the first response R1 (S2325).

When it is requested to operate the drying machine 30*e*, the recognition device 12 may recognize or identify the washing mode of the washing machine 30*d* to control the drying machine 30*e* (S2330) and transmit a guide message for setting an operation mode of the washing machine 30*e* based on the recognition result (S2335).

For example, when the washing mode of the washing machine 30*d* is in a "baby clothing course", the recognition device 12 may display a guide message for asking the user to determine whether or not to set the operation mode of the drying machine 30*e* to a mode related to the "baby clothing course".

The speech processing device 11 may generate a third speech G3 for querying the operation mode to be set in the drying machine 30*e* based on the received guide message and transmit the generated third speech G3 to the portable speech input device 21*a*. The portable speech input device 21*a* may output the received third audio G3 through the speaker 231.

The user may identify the operation mode to be set in the drying machine 30*e* based on the outputted third speech G3. For example, when it is desired to set the operation mode of the drying machine 30*e* to the mode related to the above-mentioned "baby clothing course", the user may input a second response R2 corresponding to the acceptance or agreement to the portable speech input device 21*a*. The portable speech input device 21*a* and the speech processing device 11 may transmit a response corresponding to the acceptance or agreement of the user to the recognition device 12 based on the second response R2 (S2340).

The recognition device 12 may recognize (or identify) the specification of the drying machine 30*e*, that is, modes capable of being supported by the dryer 30*e* based on the received second response R2 (S2345). According to an embodiment, step S2345 may be performed together in step S2330.

The recognition device 12 may generate control information for the drying machine 30e based on the recognition result, and transmit the generated control information to the control device 13 (S2350).

As described above, when the response R2 corresponding to the acceptance or agreement of the user is received from the user, the recognition device 12 may generate control information setting the operation mode of the drying machine 30e to the mode corresponding to the "baby clothing course" of the washing machine 30e.

On the other hand, when a response specifying a specific mode of the drying machine 30e is received from the user, the recognition device 12 may generate control information for setting the operation mode of the drying machine 30e to the mode corresponding to the received response.

The control device 13 may generate a control signal based on the received control information and transmit the generated control signal to the drying machine 30e (or to the drying machine 30e via the portable speech input device 21a) (S2355). The drying machine 30e can set the operation mode of the drying machine 30e based on the received control signal (S2360).

Further, the recognizing device 12 may transmit, to the speech processing device 11, a guide message for informing the user that the operation mode of the drying machine 30e is set based on the second response R2. The guide message may be automatically performed after step S2350, or may be performed based on a response received from the drying machine 30e after step S2360.

The speech processing device 11 may generate a fourth speech G4 providing guide on the operation mode set in the drying machine 30e based on the received guide message and transmit the generated fourth speech G4 to the portable speech input device 21a. The portable speech input device 21a may output the received fourth audio G4 through the speaker 231. The user may put the laundry contained in the washing machine 30d into the drying machine 30e and activate the dryer 30e in the operation mode set in the drying machine 30e based on the output fourth speech G4.

That is, according to the embodiment shown in FIGS. 25 and 26, the appliance control apparatus 10b may provide an appliance control service that accurately reflects a user's intention through a stepwise interaction with the user by using the recognition device 12.

According to the embodiment of the present invention, the appliance control apparatus recognizes the optimal setting environment for the appliance based on the control command received from the user or the event information received from the appliance, using the previously-learned data based on artificial intelligence such as machine learning, thereby enabling efficient operation of the appliance.

In addition, the appliance control apparatus enables optimal control of an appliance or another appliance interworking with the appliance based on an event occurring in the appliance, thereby improving convenience and satisfaction of the user.

In addition, the control command input device of the appliance control system may include a microphone to receive a user's control command in a speech from. As the control command input device is implemented, the user may control the appliance without the microphone by speech. In addition, because the appliance may not necessarily include a microphone, it is possible to avoid the development time or coat due to the performance test or testing for the optimum position required when the microphone is built into the appliance.

In addition, the appliance control apparatus generates control information for the appliance through interaction with the user through the control command input device, thereby performing an appliance control operation that accurately reflects the intention of the user. Accordingly, the user's satisfaction with the service provided through the appliance control apparatus may be maximized.

In addition, the control command input device may be connected to an appliance not equipped with a wireless communication module such as a Wi-Fi or the like through a USB interface, or may be connected through a short-range communication method such as Bluetooth. Accordingly, the appliance control apparatus may effectively control the operation of the appliance through the control command input device.

The foregoing description is merely illustrative of the technical idea of the present invention, and various changes and modifications may be made by those skilled in the art without departing from the essential characteristics of the present invention.

Accordingly, the embodiments disclosed herein are merely illustrative and are not intended to limit the technical concept of the present disclosure, and the scope of the technical idea of the present disclosure is not limited to the embodiments.

The scope of protection of the invention is to be interpreted by the following claims, all spirits within a scope equivalent will be construed as included in the scope of the present invention.

What is claimed is:

1. An appliance control apparatus comprising:
 a recognition device including:
  a communication unit connected to a speech processing device or a control command input device and configured to receive a control command for an appliance from the speech processing device or the control command input device, and
  a recognition module configured to recognize a setting environment for the appliance or a target appliance working with the appliance based on the received control command and configured to generate control information for the appliance or the target appliance based on the recognized setting environment; and
 a control device configured to:
  receive the control information from the recognition device,
  generate a control signal based on the received control information,
  transmit the generated control signal to the appliance or the control command input device connected to the appliance,
  receive a response or event information according to the control command from the appliance or the control command input device connected to the appliance, and
  transmit the received response or event information to the recognition device, wherein the recognition module is configured to:
  recognize, from the received response or event information, the setting environment for the appliance or the target appliance working with the appliance,
  generate the control information for the appliance or the target appliance based on the recognized setting environment,
  generate guide information based on the recognized setting environment, and transmit the generated guide information to the speech processing device or the control command input device.

2. The appliance control apparatus of claim 1, wherein the recognition module includes:
a first recognizer having a recognition model for recognizing the setting environment for the appliance from the received control command; and
a control information generation module configured to generate the control information based on the recognized setting environment.

3. The appliance control apparatus of claim 2, wherein the recognition module updates the recognition model included in the first recognizer using the control command and a result of the recognition.

4. The appliance control apparatus of claim 2, wherein the recognition device further includes a memory configured to store a user profile and an appliance profile, and receives external content from an external content server connected through the communication unit,
wherein the first recognizer recognizes the setting environment based on at least one of the external content, the user profile or the appliance profile, and the control command.

5. The appliance control apparatus of claim 4, wherein the user profile stored in the memory includes at least one of model information, a usage pattern, an operation history, group information, or representative appliance information per group, for appliances owned by a user, and
wherein the appliance profile stored in the memory includes information on usable functions or modes for each of the models of the appliances.

6. The appliance control apparatus of claim 2, wherein the control information generation module generates the control information including at least one of identification information of the appliance, information on a function or mode controlled based on the setting environment, or setting value information related to the function or mode, based on the recognized setting environment.

7. The appliance control apparatus of claim 6, wherein the control device acquires code information corresponding to at least one of the information on the function or mode of the appliance or the setting value information based on the identification information of the appliance included in the control information and generates the control signal including the acquired code information when receiving the control information.

8. The appliance control apparatus of claim 6, wherein the control device transmits the control signal to the appliance through a representative appliance of a group including the appliance.

9. The appliance control apparatus of claim 2,
wherein the recognition module further includes a second recognizer having a recognition model for recognizing the setting environment for the appliance or the target appliance working with the appliance from the received response or event information, and
wherein the control information generation module generates the control information for the appliance or the target appliance based on the recognized setting environment.

10. The appliance control apparatus of claim 9, wherein the recognition device updates the recognition model included in the second recognizer by using the response or event information and a result of the recognition.

11. The appliance control apparatus of claim 9, wherein the recognition device further includes a memory configured to store a user profile and an appliance profile, and receives external content from an external content server connected through the communication unit, and
wherein the second recognizer recognizes the setting environment from at least one of the external content, the user profile or the appliance profile, and the response or event information.

12. The appliance control apparatus of claim 9, wherein the recognition module further includes a guide provision module configured to generate the guide information based on the recognized setting environment, and
wherein the recognition device allows the communication unit to transmit the generated guide information to the speech processing device or the control command input device.

13. The appliance control apparatus of claim 12, wherein the recognition device
receives a response based on the guide information from the speech processing device or the control command input device,
generates the control information for the appliance or the target appliance based on the received response, and
transmits the generated control information to the control device.

14. An appliance control system comprising:
a control command input device configured to receive a control command for an appliance and configured to transmit the received control command to a recognition device or a speech processing device;
the recognition device that is configured to receive the control command from the control command input device or the speech processing device, that is recognize a setting environment for the appliance or a target appliance working with the appliance based on the received control command, and that is generate control information for the appliance or the target appliance based on the recognized setting environment; and
a control device configured to:
receive the control information from the recognition device,
generate a control signal based on the received control information,
transmit the generated control signal to the appliance or the control command input device connected to the appliance,
receive a response or event information according to the control command from the appliance, and
transmit the received response or event information to the recognition device, wherein the recognition device is configured to:
recognize, from the received response or event information, the setting environment for the appliance or the target appliance working with the appliance,
generate the control information for the appliance or the target appliance based on the recognized setting environment,
generate guide information based on the recognized setting environment, and
transmit the generated guide information to the speech processing device or the control command input device.

15. The appliance control system of claim 14, wherein the control command input device includes:
a microphone configured to receive speech containing the control command, and
a communication unit configured to transmit the received speech to the speech processing device.

16. The appliance control system of claim 15, wherein the control command input device connected to the appliance:
- connects to the appliance through an interface unit or a short-range wireless communication module of the communication unit, and
- transmits the control signal received from the control device to the interface unit or the short-range wireless communication module.

17. The appliance control system of claim 14, wherein the recognition device includes:
- a first recognizer having a recognition model for recognizing a setting environment for the appliance from the received control command; and
- a control information generation module configured to generate the control information based on the recognized setting environment.

18. The appliance control system of claim 17,
wherein the recognition device further includes a second recognizer having a recognition model for recognizing the setting environment for the appliance or the target appliance working with the appliance, from the received response or the event information, and wherein the control information generation module generates the control information for the appliance or the target appliance based on the recognized setting environment.

19. The appliance control system of claim 18,
wherein the control command input device outputs the guide information received from the recognition device or the speech processing device, receives a response based on the output guide information and transmits the received response to the recognition device or the speech processing device.

20. The appliance control system of claim 19, wherein the recognition device:
- receives the response from the speech processing device or the control command input device,
- generates the control information for the appliance or the target appliance based on the received response, and
- transmits the generated control information to the control device.

* * * * *